United States Patent [19]
Miyake

[11] Patent Number: 5,886,333
[45] Date of Patent: Mar. 23, 1999

[54] METHOD FOR ELECTRONICALLY TRANSFERRING PERSONAL INFORMATION ON CREDIT GAINING CARD, AND MINI IC CARD, ADAPTER CARD, TERMINAL ADAPTER, SLIP ISSUING DEVICE, PORTABLE USED THEREIN

[76] Inventor: Susumu Miyake, 15-13, Togashira 3-chome, Toride-shi, Ibaragi 302, Japan

[21] Appl. No.: 782,053

[22] Filed: Jan. 13, 1997

[30] Foreign Application Priority Data

Nov. 15, 1996 [JP] Japan ..................... 8-305047

[51] Int. Cl.⁶ .................. G06K 19/06; G06K 5/00
[52] U.S. Cl. ........................... 235/380; 235/492
[58] Field of Search .................... 235/492, 380, 235/381, 488, 38 R, 382.5

[56] References Cited

U.S. PATENT DOCUMENTS

| | | | |
|---|---|---|---|
| 5,281,799 | 1/1994 | McIntire et al. ................ | 235/380 |
| 5,362,955 | 11/1994 | Haghiri-Tehrani ............. | 235/492 |
| 5,531,145 | 7/1996 | Haghiri-Tehrani ............. | 83/27 |
| 5,677,524 | 10/1997 | Haghiri-Tehrani ............. | 235/492 |

*Primary Examiner*—Le Thien Minh
*Attorney, Agent, or Firm*—Oliff & Berridge, PLC

[57] ABSTRACT

On a credit IC card, issuing by a credit card company, brought by a credit payer with him/her is stored at least personal information for identifying a credit card company, a card number and a credit payer. Based on input of a code number by the credit payer and the stored information read out from the credit IC card, a cellular telephone is used to automatically inquire of an information center of the credit card company whether the credit can be gained. This can therefore eliminates complication involved by payment using the credit IC card and ensures smooth use of the credit IC card, with the cost performance being increased to spread the expensive credit IC card.

5 Claims, 22 Drawing Sheets

METHOD FOR ELECTRONICALLY TRANSFERRING PERSONAL INFORMATION ON CREDIT GAINING CARD, AND MINI IC CARD, ADAPTER CARD, TERMINAL ADAPTER, SLIP ISSUING DEVICE, PORTABLE USED THEREIN

BACKGROUND OF THE INVENTION

1. Field of the Invention

The present invention relates to a method for electronically transferring personal information for identifying: an organization issuing a credit gaining card, e.g., a credit card from a credit card company, a cash card from a financial organization such as a bank, a prepaid card or an electronic money card; a card number; and a card user. The invention more particularly relates to a method for electronically transferring personal information of a credit gaining card, a mini IC card, an adapter card, a terminal adapter, a slip issuing device and a portable terminal which are used in this method, by which complication for payment using a credit card can be eliminated, use of a credit card being smoothed, the utility value of a credit IC card being improved to enhance cost performance, spread of the expensive IC card compared with a regular credit card on which the personal information is magnetically written or reduction in the production cost of the IC card involved by increase in the mass production being achieved. It is to be noted that the slip issuing device is an apparatus for issuing a slip to be handed to a card user such as a credit payer for confirmation from a card acceptable store, e.g., a store accepting payment on credit, the apparatus being provided with a printer or the like.

For example, in the present invention, the credit gaining card can be used when inserted into or connected with a portable terminal such as a cellular telephone, and the credit gaining card can be used together with an adapter card as any of various conventional cards, i.e., credit cards, prepaid cards, cash cards or electronic money by a conventional magnetic card or IC card. In this case, the utility value therefore becomes high without a slip issuing device exclusively used for the credit gaining card and card issuing organizations such as credit card companies or card acceptable shops such as those dealing with payment on credit can put off their investment to the slip issuing device without causing any problem even though the spread of the slip issuing device is delayed. That is, the credit gaining card has an advantage in terms of convenience or investment effect. Further, various devices which will be described later in this specification can be applied to an integrated-circuit chip for use in the credit gaining card in a portable terminal, and compatibility with a regular magnetic card which has been commonly used can be considered, thereby stimulating the spread of the credit gaining card.

2. Prior Art

There has been widely used a magnetic card made of plastic issued from a card issuing organization (referred to as a card company hereinbelow) such as a credit card company, with which cash-less shopping or various services are enabled when brought with a user to a card acceptable store such as that accepting payment on credit. Personal information such as a name of card company or a card number is magnetically stored on the magnetic card. The card user is identified by a name of the card company and the card number. Note that the information for identifying the card company, the card number and the card user is referred to as personal information.

Electronic money made of plastic in which the integrated-circuit chip is embedded has been also experimentally used. A credit card incorporating the IC card having the integrated-circuit chip embedded therein can be also considered. A large amount of information can be stored in the IC card as compared with the magnetic card because the IC card is provided with the integrated-circuit chip. A credit IC card can also store information used for any purpose other than the credit card as well as the personal information.

A unit price of one IC card is, however, higher than that of the regular magnetic card. Further, since the regular magnetic card has been widely spread, there is a social problem such as that transition to the credit IC card must be smoothly carried out with taking into account the present situation. Furthermore, any associated device such as a novel slip issuing device must be commonly used in order to enhance the spread of the credit IC card, but investment to such an associated device is difficult unless the credit IC card is widely used.

Spread of the credit IC card is difficult although the IC card looks very promising. In regard of convenience as a credit card, the card must be largely spread in order that the card is utilized by a large number of card users and dealt in many card acceptable stores.

SUMMARY OF THE INVENTION

In view of the above-described drawbacks, the present invention intends to connects a portable terminal, e.g., a cellular telephone with a credit gaining card and aims a multiplier effect with convenience of a portable terminal such as a cellular telephone which has recently spread as well as smooth transition from the magnetic card which has been commonly used.

It is therefore an object of the present invention to eliminate complication for payment using a credit gaining card, enable smooth use of the credit gaining card, improve the utility value of the credit gaining IC card to enhance cost performance, spread the credit gaining IC card which is expensive as compared with a regular magnetic card on which the personal information is magnetically written, and reduce the credit gaining IC card manufacturing cost involved by the mass production.

According to a first aspect of the present invention, a method for electronically transferring personal information on a credit gaining card solves the above-described problems by receiving an IC card having at least personal information for identifying a card issuing organization, a card number and a card user stored therein, and automatically inquiring of an information center of the card issuing organization whether credit can be gained based on input of a code number by the card user and the stored information electronically read from the IC card.

In the first aspect of the present invention, the IC card is connected with a portable terminal to provide to the portable terminal a function for automatically carrying out the inquiry and a function for displaying a result of the inquiry; the card user connects the IC card to the portable terminal and inputs the code number using push-button digits on the portable terminal in order to perform the inquire utilizing the radio communication function of the portable terminal and to display a result of the inquiry on the portable terminal, thus coping with a later-described hand-writing slip system.

If it was found that the credit can be gained as a result of the inquiry, necessary information is received by the slip issuing device in a card acceptable store which is connected to the information center over a wire telephone line so that the slip is issued, thereby coping with a looped information transmission system of a later-described current slip issuing device system in particular.

Further, in the first aspect of the present invention, a function for connecting the IC card to automatically making the inquiry is provided to a mutually connected portable terminal and a terminal adapter for connecting the portable terminal to a wire telephone line; a function for displaying a result of the inquiry is imparted to the portable terminal; the card user connects the IC card to the portable terminal; the code number is input by using push-button digits on the portable terminal; the inquiry is carried out using the portable terminal and a wired call function of the terminal adapter; a result of the inquiry is displayed on the portable terminal; and necessary information is received by a slip issuing device in a card acceptable store, which is connected to the information center over a wired telephone line, so as to issue the slip if it was found that the credit can be gained as a result of the inquiry, thereby coping with a later-described terminal adapter utilization system of a current slip issuing device system in particular.

Additionally, in the first aspect of the present invention, a result of the inquiry is stored in the IC card so that it can be maintained even after disconnecting the IC card from the portable terminal, and the adapter card can be thereby used in a later-described adapter card utilization system in the current slip issuing device system and an off-line system in a new slip issuing device system, in particular.

Moreover, in the first aspect of the present invention, the size of the IC card is made smaller than that of a regular magnetic card on which the personal information is magnetically written so that the IC card can be inserted into the portable terminal, and the IC card is inserted into the adapter card which is as large as the regular magnetic card to read out the personal information as information magnetically written on the adapter card with compatibility with the magnetic card being achieved, thereby coping with the later-described adapter card utilization system in the current slip issuing device system in particular.

Further, in the first aspect of the present invention, the IC card is connected with the slip issuing device to automatically perform the inquiry and to impart a function for issuing a slip to the slip issuing device; the card user connects the IC card to the slip issuing device, inputs the code number by operating keys on the slip issuing device and carries out the inquiry utilizing a wire telephone call function of the slip issuing device; and necessary information is received by the slip issuing device to issue a slip if it was found that the credit can be gained as a result of the inquiry, thus coping with a later-described on-line system of the new slip issuing device system in particular.

In the first aspect of the present invention, security for preventing the code number from leaking may be improved by storing the code number only in the information center and inquiring of the information center about the input code numbers one by one for collation. On the other hand, the IC card storing, e.g., the code number may be abused if lost.

Further, in the first aspect of the present invention, the opportunity for using the IC card may be increased by enabling the necessary personal information to be appropriately downloaded from the information center also storing the personal information in any other card issuing organization other than an organization issuing the card in question.

In the first aspect of the present invention, the IC card may have the personal information in any other card issuing organization other than an organization issuing the card in question stored therein in order to increase the opportunity for utilizing the IC card.

According to a second aspect of the present invention, there is provided a mini IC card issued from a card issuing organization for use in payment or the like to a card acceptable store by a card user and having a memory portion for storing at least personal information for identifying a card issuing organization, a card number and the card user and a signal transferring portion for transmitting/receiving the personal information to/from outside, the mini IC card being made smaller than a regular magnetic card on which the personal information is magnetically written, having a size so that it can be inserted into a portable terminal and being usable as the IC card according to the first aspect of the present invention.

According to a third aspect of the present invention, there is provided an adapter card capable of reading out the personal information stored in the mini IC card according to the second aspect by a card reader, the adapter card being provided with a slot into which the mini IC card is inserted and a signal transferring portion for transmitting/receiving information to/from the reader and being as large as a regular magnetic card, thereby coping with a later-described adapter card system in the current slip issuing device system.

It is to be noted that the signal transferring portion according to the first and second aspects of the present invention is not restricted to a specific mode for transferring information, and there may be adopted a mode for directly transferring signals by contacting signal terminals with each other, that for magnetically transferring signals as in the conventional magnetic card, that for electrostatically transferring signals, or that for transferring signals in the contact-free manner by electromagnetic induction of an inductive antenna. For example, a similar method applied to GSM (Global System for Mobile Communications) portable terminal, which will be described later may be used.

According to a fourth aspect of the present invention, there is provided a terminal adapter used for inquiring of the information center in a card issuing organization whether the credit may be gained when connected with the portable terminal into which the mini IC card according to the second aspect is inserted, the terminal adapter being used in, in particular, a later-described terminal adapter utilization system of the current slip issuing system, by providing a function for connecting the portable terminal to the information center through a wired telephone line when the portable terminal automatically inquires of the information center of the card issuing organization whether the credit may be gained based on input of the code number by the card user and the stored information electronically read out from the mini IC card.

According to a fifth aspect of the present invention, there is provided a slip issuing device, to which the mini IC card according to the second aspect is connected, for inquiring of the information center of the card issuing organization whether the credit may be gained, the slip issuing device being used in accordance with a later-described new slip issuing device system by being provided with a function for automatically inquiring of the information center of the card issuing organization whether the credit can be gained based on input of the code number by the card user and the stored information electronically read out from the mini IC card and a function for issuing a slip upon receiving necessary information from the information center.

According to a sixth aspect of the present invention, the portable terminal to which the mini IC card can be inserted includes therein a one-chip integrated circuit provided with at least a part of functions of a regular portable terminal and at least the basic element in the function for automatically inquiring of the information center of the card issuing organization whether the credit can be gained based on input of a code number by the card user and the stored information electronically read out from the mini IC card, in order to enhance spread of the mini IC card. Provision of the one-chip integrated circuit to a portable terminal manufacturer by a mini IC card issuer or a telephone company for the portable terminals can involve the manufacturer to incorporate the function for inquiring whether the credit can be gained into the portable terminal, thereby increasing a number of portable terminals for use with the mini IC card to advance the spread of the mini IC card.

Further, if the integrated-circuit chip is commonly used irrespective of, e.g., manufacturers or products, the functions or the operation can be standardized even though the telephone companies, credit card companies or portable terminal manufacturers differ. Although the integrated-circuit chip is included in the portable terminal to be used, it may be used in a slip issuing device 6 adopting a new slip issuer system which will be describe later or any other associated device. It is to be noted that a specific example of a function incorporated into the integrated-circuit chip will be described later in the description of the preferred embodiments.

In any of the above-mentioned aspects of the present invention, the portable terminal is not specifically limited to a certain type, but it may be of, e.g., a cellular telephone.

Results of the present invention will now be briefly described in connection with the first aspect as a typical example of the present invention.

One important element affecting convenience of the credit gaining card is how the inquiry on whether the credit can be gained is effected in a short time. In regard of hardware, there are various communication means for inquiring of the information center of the card issuing organization whether the credit can be gained, enhancing convenience. As the credit gaining card itself, the IC card not only has a large storage capacity but also enables the high-speed access to the written information.

According to the present invention configured in view of the above-described points, the utility value of the IC card can be improved by smooth use of the credit gaining card without complication for payment using the credit gaining card. Improvement of the utility value enhances the cost performance to stimulate the spread of the IC card which is expensive as compared with the conventional magnetic card. The spread of the IC card involves increase in a number of card acceptable stores and reduction in the production cost of the IC card or associated devices with the increased supply.

For example, in the present invention, the IC card can be inserted into or connected with the portable terminal such as a cellular telephone to be used, and it can be used together with, e.g., an adapter card as any of conventional various cards, i.e., credit cards, prepaid cards, cash cards or electronic money cards adopting the conventional magnetic cards or the IC cards. In this case, the utility value is therefore increased without the slip issuing device exclusively used for the credit gaining IC card, and the card issuing organization or the card acceptable store can put off investment to the slip issuing device with no problem even if the spread of the slip issuing device is delayed. That is, the spread of the credit gaining IC card is advantageous in terms of convenience or investment effects. Also, ingenuity which will be described later in the description of the preferred embodiment according to the present invention can be put into the integrated-circuit chip for using the credit gaining IC card in the portable terminal such as a cellular telephone, and compatibility with the widely-spread regular magnetic card can be taken into consideration, thereby advancing the spread of the credit gaining IC card.

The above and other novel features and advantages of the present invention are described in or will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DESCRIPTION OF THE PREFERRED EMBODIMENTS

Preferred embodiments according to the present invention in which the credit gaining card is mainly of a credit card will now be described in detail hereinbelow with reference to the accompanying drawings.

Regular magnetic cards have been already commonly used, an issue of compatibility with those conventional magnetic cards is therefore important when providing new cards such as a credit IC card. Compatibility can ensures the smooth spread of or transition to the new cards. Serious problems may hardly occurs even if the spread of or investment to associated devices such as a slip issuing device for using the new cards is delayed. The following embodiments take into account enhancement of the spread of the credit IC card as well as the above issue.

Figure 1:
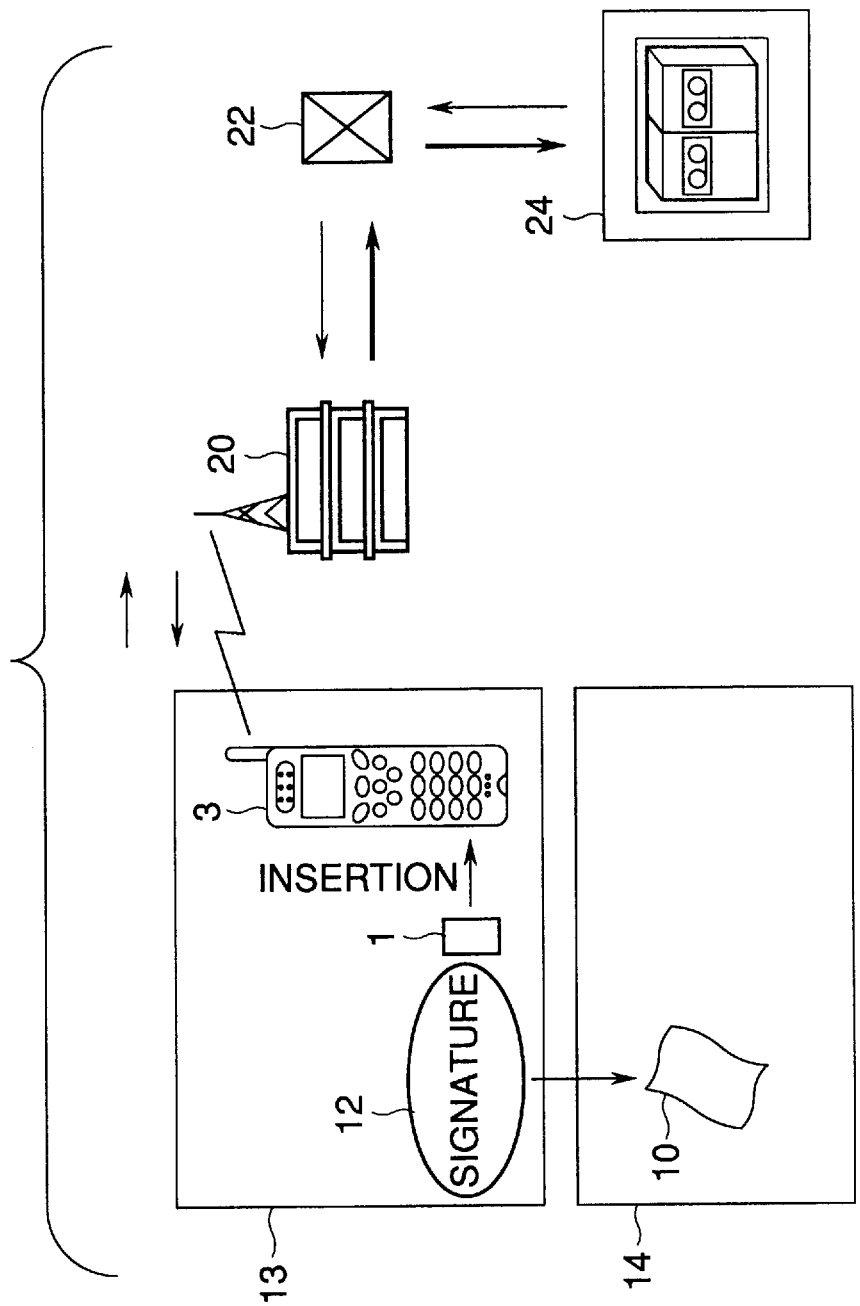
FIG. 1 is a block diagram showing a first embodiment to which a method for electronically transferring personal information on a credit gaining card is applied according to the present invention.

FIG. 1 is a block diagram showing a first embodiment to which a method for electronically transferring personal information on the credit gaining card is applied according to the present invention. This embodiment deals with a hand-written credit slip and is determined to be referred to as a hand-written slip system.

Figure 2:
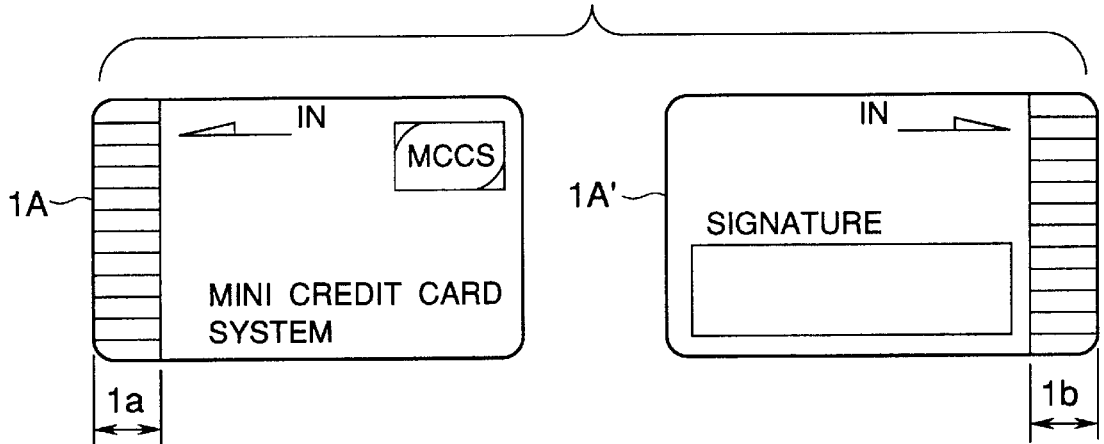
FIG. 2 is top plan views showing a first example of a mini card used in the first embodiment.
Figure 3:
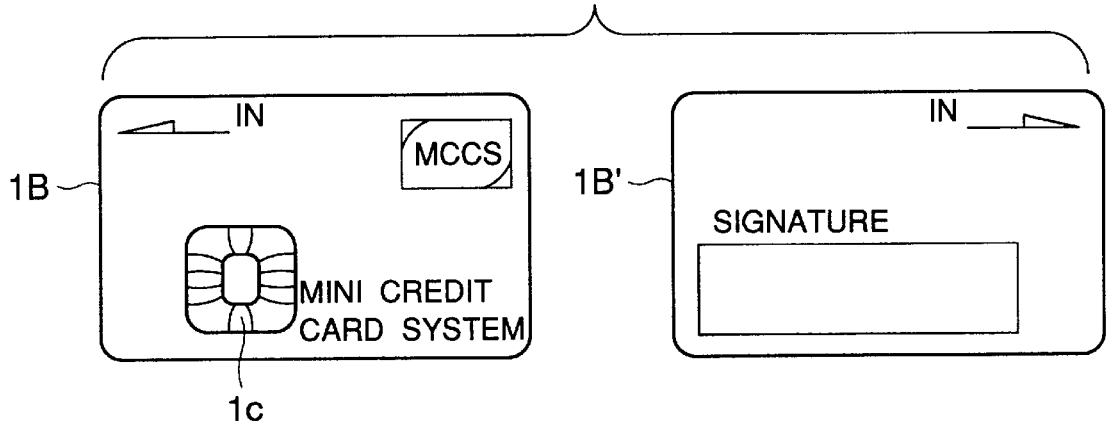
FIG. 3 is top plan views showing a second example of the mini card used in the first embodiment.
Figure 4:
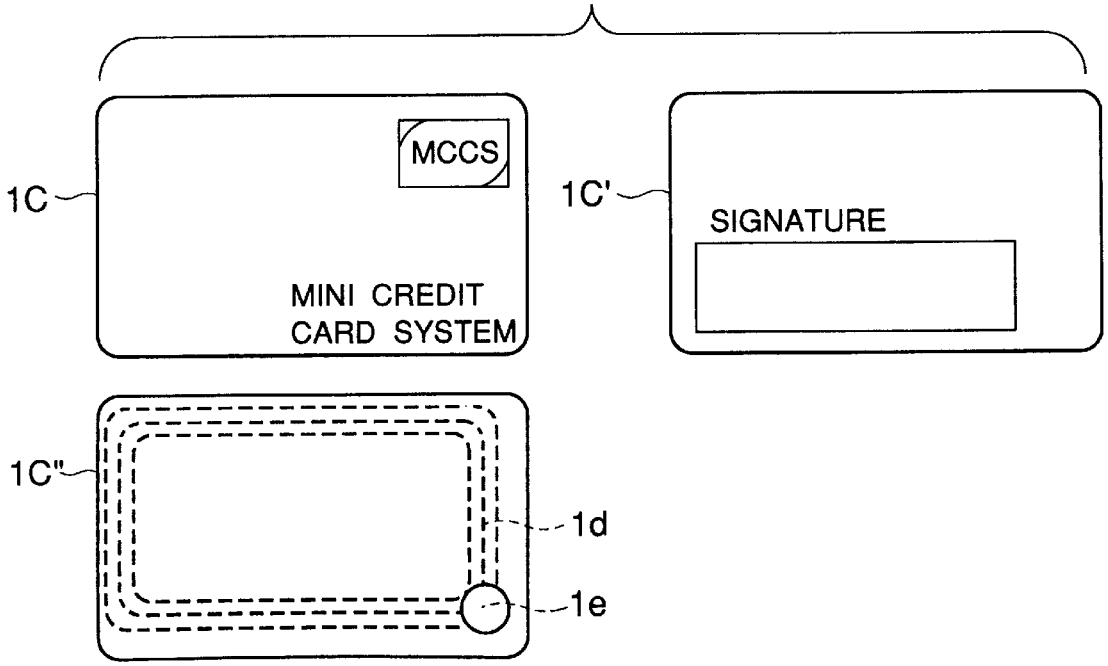
FIG. 4 is top plan views showing a third example of the mini card used in the first embodiment.

A first example of a mini IC card (referred to as a mini card hereinbelow) 1 in FIG. 1 is as illustrated in FIG. 2, in which reference character 1A denotes a front surface while reference character 1A' designates a rear surface. External connection terminals are provided to portions represented by reference characters 1a and 1b. Further, a second example of the mini card is as shown in FIG. 3. Reference character 1B denotes a front surface, and reference character 1B' designates a rear surface. An external connection terminal is disposed to a portion represented by reference character 1c on the front surface. Furthermore, a third example of the same is as shown in FIG. 4, in which reference character 1C represents a front surface while reference character 1C' denotes a rear surface. Reference character lC" shows a perspective view from the front side. In the third example, wires are drawn out from an embedded integrated-circuit chip 1e to form an inductive antenna 1d.

In the first and second examples of the mini card 1, electric power is fed from and information such as personal information is input/output to/from the external connection terminal. As different from the first or second example, no external connection terminal is provided but the inductive antenna 1d ensures the power supply and transfer of signals in contact-free manner in the third example. A kind of credit IC card is shown in these drawings, and the size of the card is smaller than that of an ordinary magnetic card so that it can be readily inserted into a later-described small cellular telephone 3. In regard of horizontal and vertical dimensions, assuming that a longer one be the horizontal dimension, the horizontal length may be approximately 20 mm to 80 mm and the vertical length may be approximately 20 mm to 40 mm. The thickness may be equal to or less than 0.75 mm. A cardholder signs in an area under printed characters "SIGNATURE" on the back surface in each example of the card.

Such a mini card 1 is not only used as a credit card as in this embodiment and later-described embodiments but also used for various services provided by each card issuing organization, the card 1 being also utilized as a prepaid card, a cash card or an electronic money card. The maximum amount of credit is written in the mini card 1 when used as the prepaid card, the cash card or the electronic money card in a fifth embodiment which will be described later, and the writing operation will be explained in the fifth embodiment.

Figure 5:
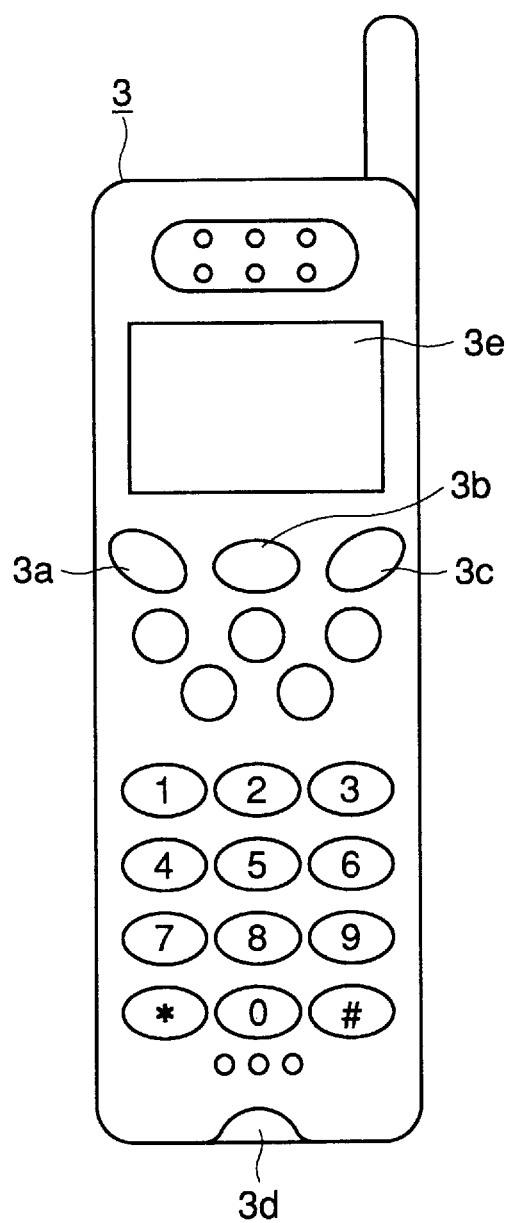
FIG. 5 is a front view showing a cellular telephone used in the first embodiment.
Figure 6:
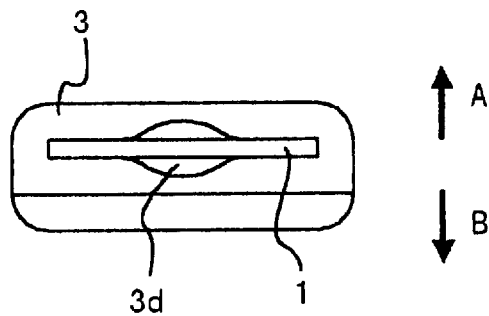
FIG. 6 is a bottom view of the cellular telephone.

A front and bottom views of the cellular telephone 3 in FIG. 1 are as shown in FIGS. 5 and 6, respectively. In FIG. 6, an arrow A indicates a front surface on which a liquid crystal display unit 3e or various buttons are provided, and an arrow B indicates a back surface. In FIG. 5, reference character 3a denotes a call start button and reference character 3b designates a call cancel button, for example. Reference character 3c represents a credit button inherent to this embodiment.

When used as a regular cellular telephone to make a phone call, a call start button 3a is first pushed, and the dial operation is then carried out using ten keys, i.e., push-button digits after a dial tone is heard from a receiver. Or, when used as a regular cellular telephone to receive an incoming call, the call start button 3a is simply pushed. Upon terminating the service, the call cancel button 3b is pushed.

In addition, the mini card 1 can be inserted into an inner slot from a slit 3d provided on the bottom surface of the cellular telephone 3. FIGS. 5 and 6 show the cellular telephone 3 in which the mini card 1 has been already inserted. Insertion of the mini card 1 involves input/output of information to/from the cellular telephone 3 through the external connection terminal 1a or 1b in FIG. 2 or 1c in FIG. 3, or the inductive antenna 1d in FIG. 4.

It is to be noted that the cellular telephone 3 in this embodiment is of a digital type, but the telephone is not restricted to a certain type. For example, it may be of a simplified handy telephone. Or, it may be of a GSM to which a card reader is attached. In other words, the present invention is achieved by assuming various kinds of mobile communication terminals (portable terminals). In case of such a cellular telephone 3, various ingenuity is put into the configuration of the embedded integrated-chip as will be described later with reference to FIGS. 26 and 27.

While referring to FIG. 1, the general operation of this embodiment will now be described in connection with a flowchart of FIG. 7.

Referring to the flowchart, the following describes the procedure for making inquiry on whether the credit can be gained using the mini card 1 which was issued by a credit card company and brought by a credit payer (which will be simply referred to as inquiry on whether the credit can be gained) in this embodiment as well as the second and all the subsequent embodiments. The flowchart according to the eighth embodiment, however, describes the credit payment using the cellular telephone 3 in the mail-order selling, and hence a credit payer 13 does not bring the mini card 1 with him/her to a credit payment acceptable retailer 14 nor writes his/her signature 12.

In the first embodiment, the mini card 1 is first inserted into the slit 3d of the cellular telephone 3 at the step 110. The connection and call operation is then performed at the step 112.

Figure 8:
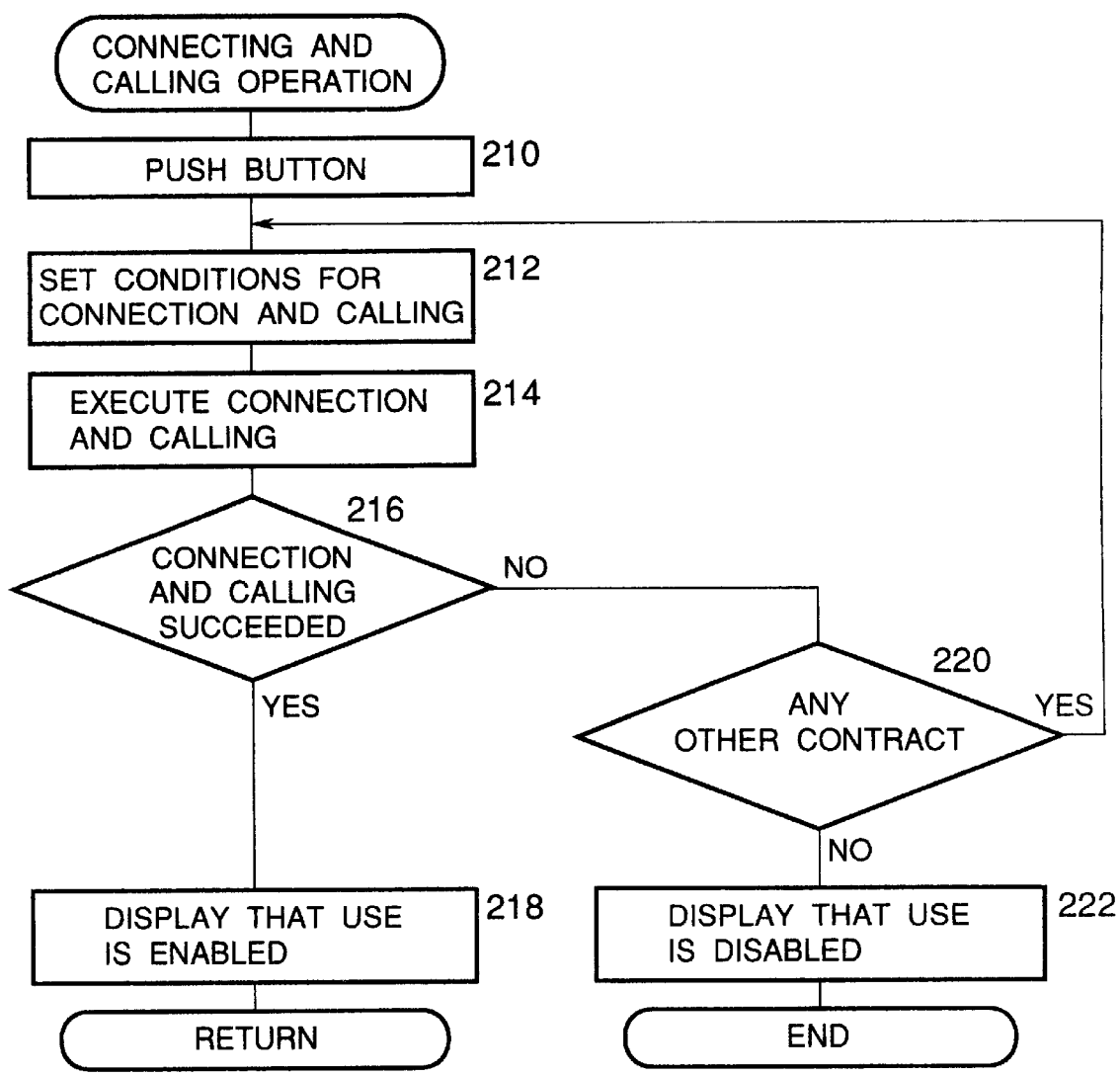
FIG. 8 is a flowchart showing a connecting and calling operation of the first embodiment.

As shown in FIG. 8, there are performed in the mentioned order three processes, i.e., (1) pushing the credit button 3c of the cellular telephone 3 (step 210); (2) connecting the cellular telephone 3 to a radio line base station 20 over a radio line of the cellular telephone to be further connected to a host computer 24 over a telephone line (wire line) through a telephone exchange 22 (steps 212 to 216 and step 220); and (3) displaying usability of the card determined by a card company and a card number stored in the mini card 1 (steps 218 and 222). If the card can not be used ("N" in the step 216) but a cardholder has entered into a contract with any other card company ("Y" in the step 220), the above process (2) is repeated to enable use of the card in regard of that card company. Note that the step 212 is a process for inputting selection of a card company by the cursor button operation or a process associated therewith while connection carried out at the step 214 is made using a telephone number previously written on the mini card. The host computer 24 is installed by a card issuing organization such as a card company (when the card is used as a credit card) or a bank (when the card is used as a cash card or electronic money card).

Figure 7:
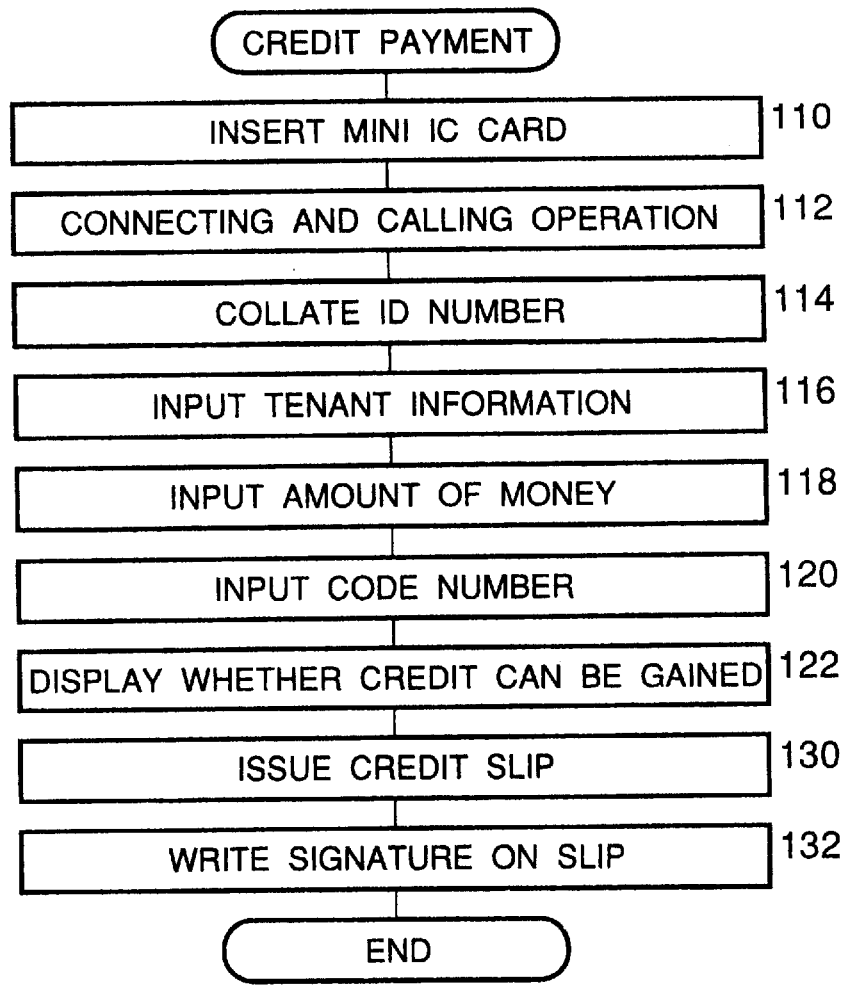
FIG. 7 is a flowchart showing general operation of the first embodiment.

If use of the mini card is enabled in this manner, the ID number collation is judged to be successfully made at the step 114 in FIG. 7. At the step 116, tenant information of a credit payment acceptable retailer 14 is then input in accordance with the direction displayed on the liquid crystal display unit 3e. Under the direction displayed on the Liquid crystal display unit 3e, a kind and an amount of currency are input for making the inquiry on whether the credit can be gained at the step 118. At the step 120, the credit payer inputs his/her code number in accordance with the direction displayed on the liquid crystal display unit 3e.

This code number is not stored in the mini card 1 or the cellular telephone 3, and is collated with data in a computer 24 installed in an information center of a card company in accordance with each input. Since the code number is stored only in the host computer 24 in this manner, the code number can not be stolen and the mini card 1 can not be thus improperly used even if the mini card 1 or the cellular telephone 3 is lost.

If coincidence of the code number is confirmed at the step 120 and the tenant information input at the step 116 and the amount of money input at the step 118 are appropriate, the liquid crystal display unit 3e displays that the credit can be gained at the step 122, or otherwise the unit 3e displays that the credit can not be gained. Based on the display that the credit can be gained as a result of the inquiry, a responsible person in a credit payment acceptable store 14 issues a credit slip 10 by hand writing at the step 130. The credit payer 13 writes his/her signature 12 in a predetermined area on this credit slip 10.

In this manner, the credit payer 13 just inserts his/her mini card 1 into the cellular telephone 3 (step 110), pushes the credit button 3c (step 112), inputs the code number (step 120), and writes his/her signature (step 132) in this embodiment. Also, the credit payment acceptable retailer 14 only performs input of the tenant information (step 116), input of the amount of money (step 118) and issue of the credit slip (step 130), and these processes can be rapidly executed when skilled. According to this embodiment, complication for payment using the credit card is eliminated and the credit card can be smoothly used to improve the utility value of the credit IC card. Even if the operation for connecting with and calling a credit card company is failed at the step 112, the same operation can be carried out with respect to any other credit card company with which a cardholder has entered into a contract at the step 216 or 220, so that the cardholder can try connection with a plurality of card companies using one mini card while taking an advantage of large storage volume of the IC card.

Figure 9:
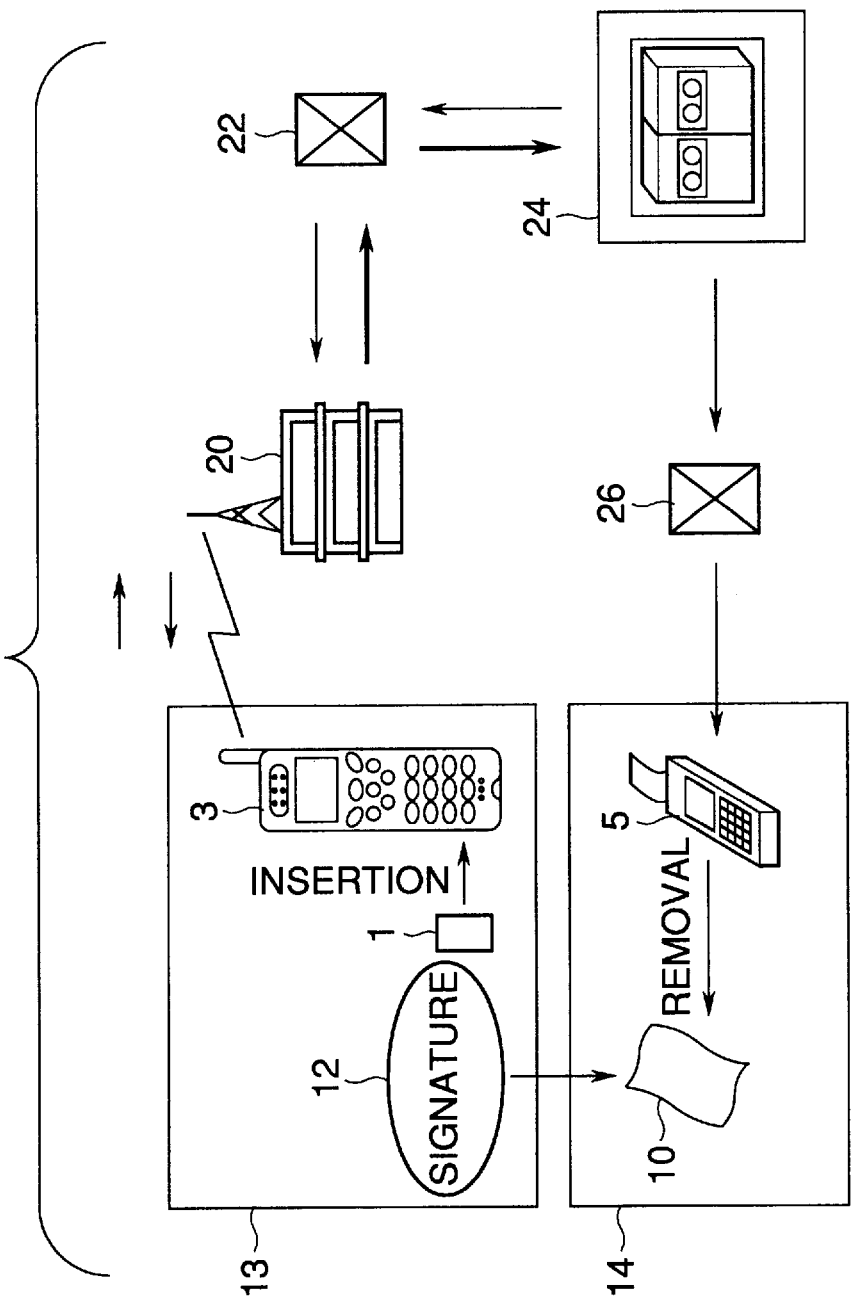
FIG. 9 is a block diagram showing a second embodiment to which the present invention is applied.

FIG. 9 is a block diagram showing a second embodiment to which a method for electronically transferring personal information on the credit gaining card is applied according to the present invention. This embodiment adopts a system using a current slip issuing device (referred to as a current slip issuing device system), and more particularly a system by which the inquiry on whether the credit can be gained is made by a radio call function of the cellular telephone 3 and a result thereof is obtained over a telephone wire line (referred to as a looped information transmission system). Like reference numerals denote like parts throughout the disclosed embodiments including the flowcharts.

In FIG. 9, reference numeral 5 designates a current slip issuing device. The slip issuing device 5 does not have newly-provided portions denoted by reference characters 6a and others in a new slip issuing device 6 which will be described later in connection with FIG. 20. Upon receiving the personal information, whose validity has been confirmed, transmitted from the host computer 24 through the telephone exchange 26, the slip issuing device 5 automatically issues a credit slip 10.

Figure 10:
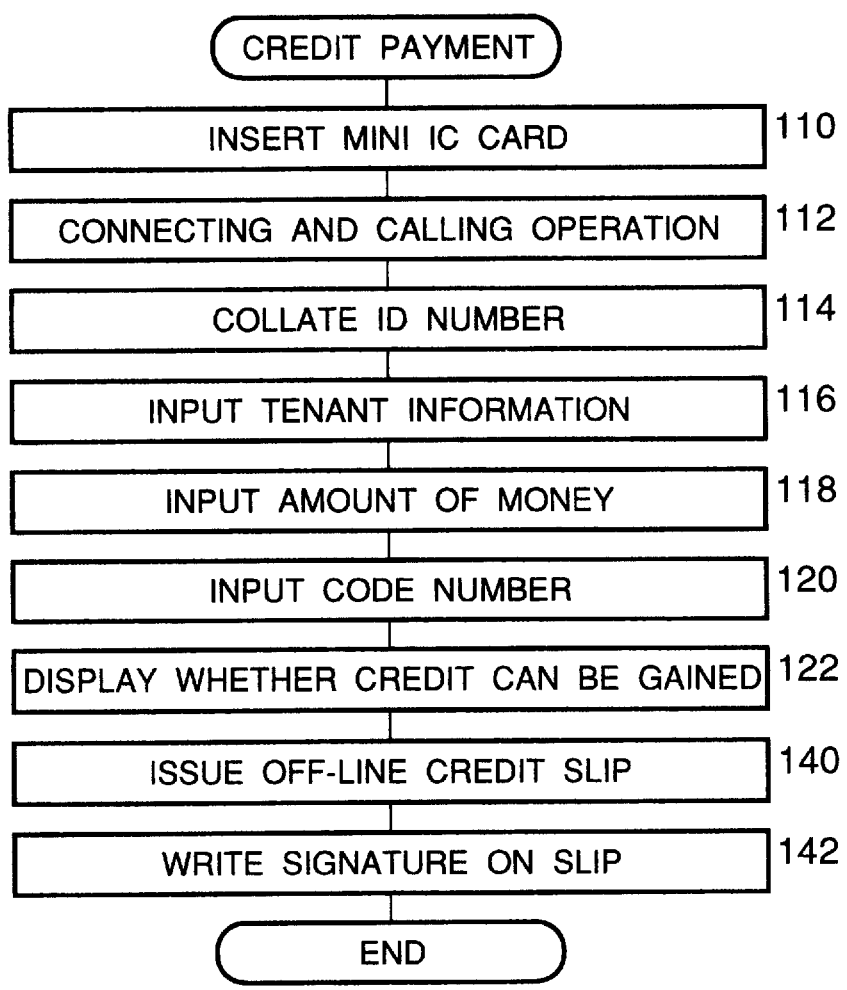
FIG. 10 is a flowchart showing operation of the second embodiment.

Explaining the operation of this embodiment with reference to a flowchart of FIG. 10, the processes of the steps 110 through 112 having the similar reference numerals as in the flowchart of FIG. 7 are identical with those in FIG. 7. At the following step 140, based on the tenant information input by keys on the cellular telephone 3 and fed via the radio line base station 20 and the telephone exchange 22, the host computer 24 deduces a telephone number of the credit payment acceptable retailer 14, calls and connects with the slip issuing device 5 over the telephone wire line via the telephone exchange 26, and directs the slip issuing device 5 to issue the credit slip 10 while transmitting the necessary information to the slip issuing device 5. The slip issuing device 5 then automatically prints out the credit slip 10. The credit payer 13 writes his/her signature 12 on the issued credit slip 10 at the step 142.

The further automation is achieved in the second to embodiment as compared with the above-mentioned first embodiment, thereby automatically issuing the credit slip 10 using the slip issuing device 5. This can therefore eliminates complication for payment using the credit card and ensures smooth use of the credit card to improve the utility value of the credit IC card.

Figure 11:
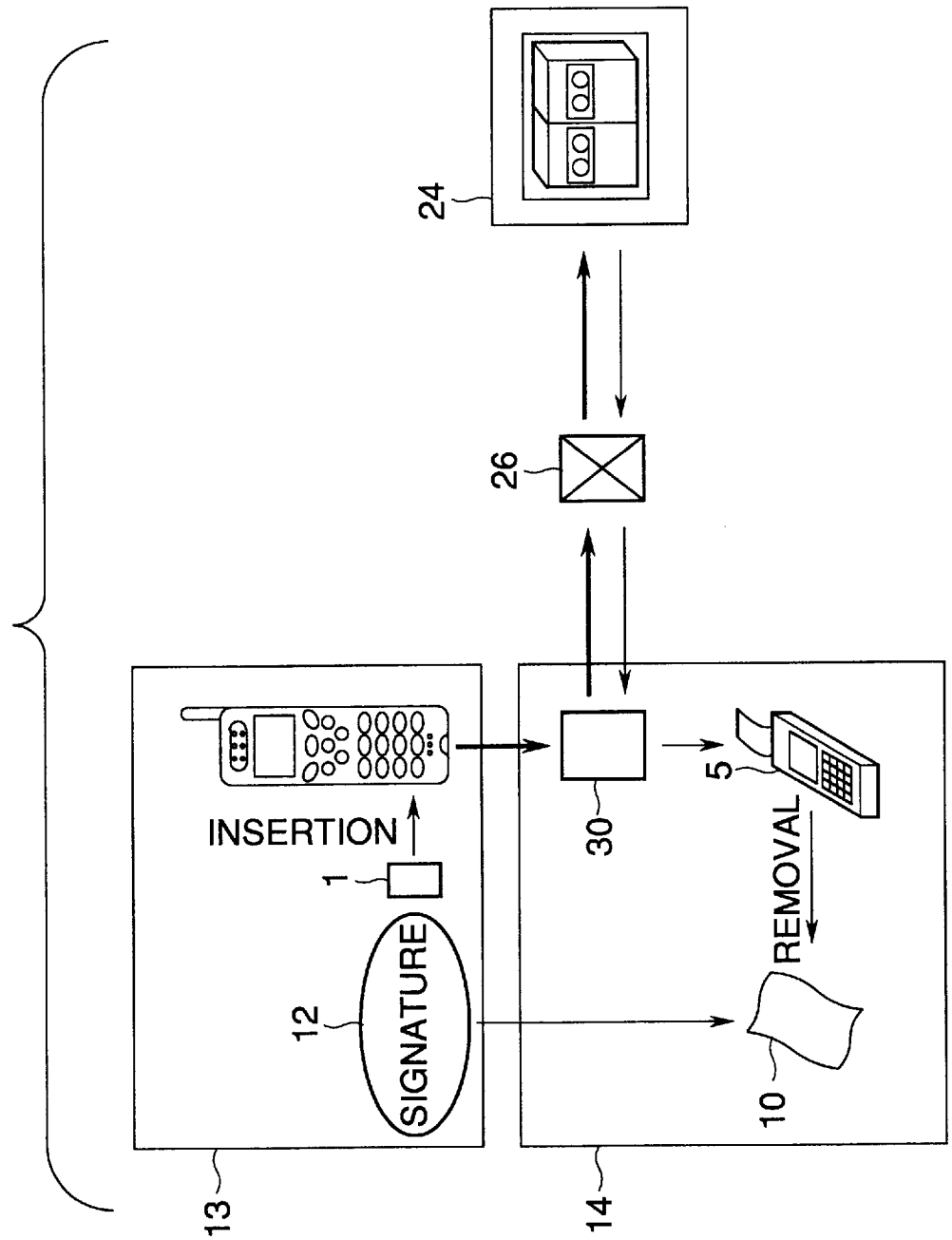
FIG. 11 is a block diagram showing a third embodiment to which the present invention is applied.

FIG. 11 is a block diagram showing a third embodiment to which a method for electronically transferring the personal information of the credit gaining card is applied according to the present invention. This embodiment also employs the system using the current slip issuing device (included in the current slip issuing device system in the second embodiment as a system). This embodiment is characterized in that connection is made to the host computer 24 by using a terminal adapter 30 (which will be referred to as a terminal adapter utilization system).

Figure 12:
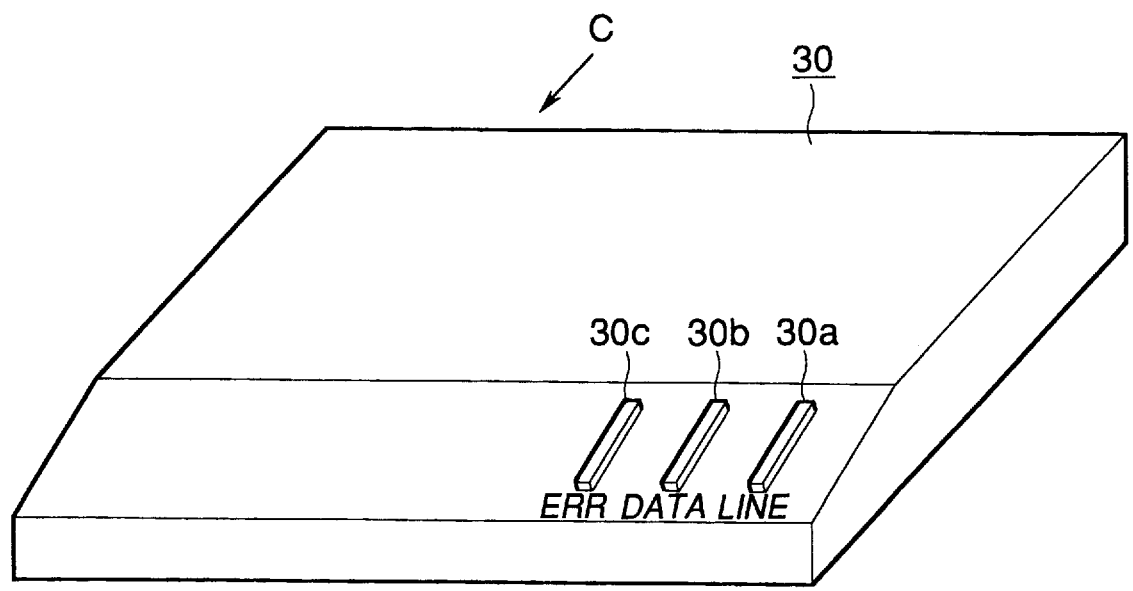
FIG. 12 is a perspective view showing a terminal adapter used in the third embodiment.
Figure 13:
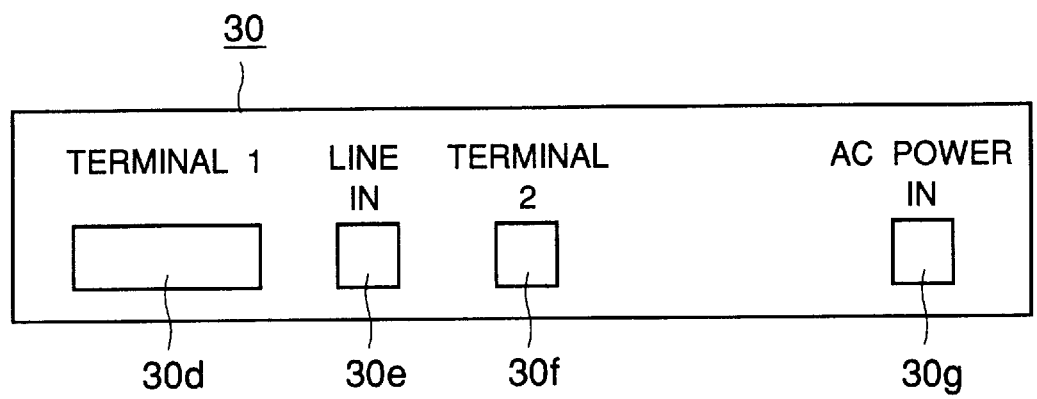
FIG. 13 is a rear view of the terminal adapter.

This terminal adapter 30 is as shown in FIG. 12 (perspective view) and FIG. 13 (rear view). On the operation panel on the front surface of the terminal adapter 30 are provided a line lamp 30a for indicating that all the connections are normal, a data lamp 30b for indicating that transfer of the data with respect to the host computer 24 over the telephone wire line via the telephone exchange 26 is actually effected, and an error lamp 30c for indicating occurrence of an error in transfer of the data. On the FIG. 13 back surface of the same viewed from an arrow C in FIG. 12 are disposed a cellular telephone connecting portion 30d for connecting the cellular telephone 3, a telephone line connecting portion 30e for connecting the telephone line of the telephone exchange 26, and a slip issuing device connecting portion 30f for connecting the slip issuing device 5. Note that a power supply code for supplying alternating current power to the terminal adapter 30 is connected to the alternating current power supply connecting portion 30g.

Figure 14:
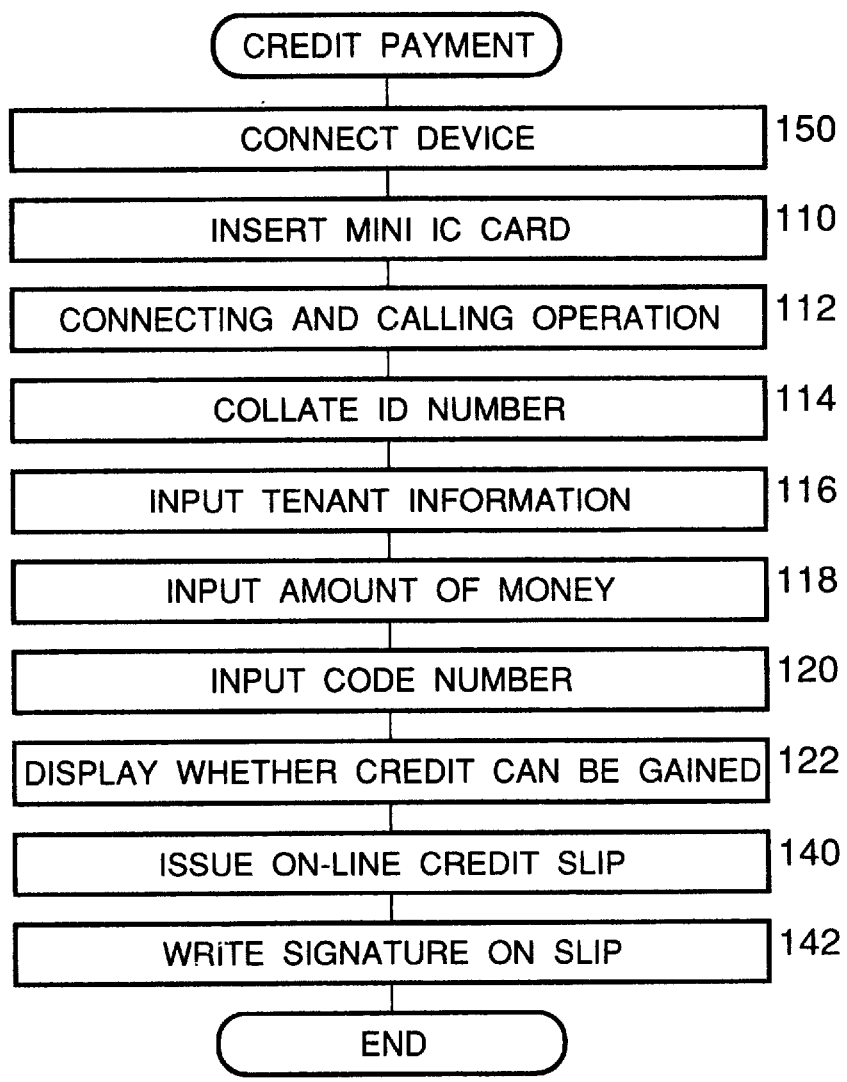
FIG. 14 is a flowchart showing operation of the third embodiment.

Explaining the operation of this embodiment with reference to a flowchart of FIG. 14, various connections in the terminal adapter 30 are first made at the step 150. That is, the cellular telephone 3 is connected with the cellular telephone connecting portion 30d; the telephone line of the telephone exchange 26, to the telephone line connecting portion 30e; and the slip issuing device 5, to the slip issuing device connecting portion 30f.

The processes of the consecutive steps 110 through 122 are the same with those designated by the like reference numerals in FIG. 7. However, the cellular telephone 3 is connected with the host computer 24 through the radio line base station 20 and the telephone exchange 22 by using the radio call function of the cellular telephone 3 in FIG. 7, whereas the terminal adapter 30 is used to connect the cellular telephone 3 to the host computer 24 over the telephone wire line via the telephone exchange 26 in this embodiment.

In regard of the consecutive steps 140 through 142, the processes identical to those represented by the same reference numerals in FIG. 10 are carried out. In this embodiment, the slip issuing device 5 is connected with the telephone line of the telephone exchange 26 through the terminal adapter 30. Since the slip issuing device connecting portion 30f of the terminal adapter 30 is connected with the telephone line connecting portion 30e inside the terminal adapter 30, the slip issuing device 5 is substantially connected with the telephone line of the telephone exchange 26 directly in this embodiment.

This embodiment ensures the same functions and results as in the second embodiment. The cellular telephone 3 is connected with the host computer 24 by utilizing the radio call function of the cellular telephone 3 in the second embodiment, whereas the cellular telephone 3 is connected with the computer 24 by using only the telephone wire lines in this embodiment. Connection is thus advantageously achieved even in such a place as that the radio call function is hardly used and electric waves are interrupted, for example, inside a building or underground, in this embodiment.

Figure 15:
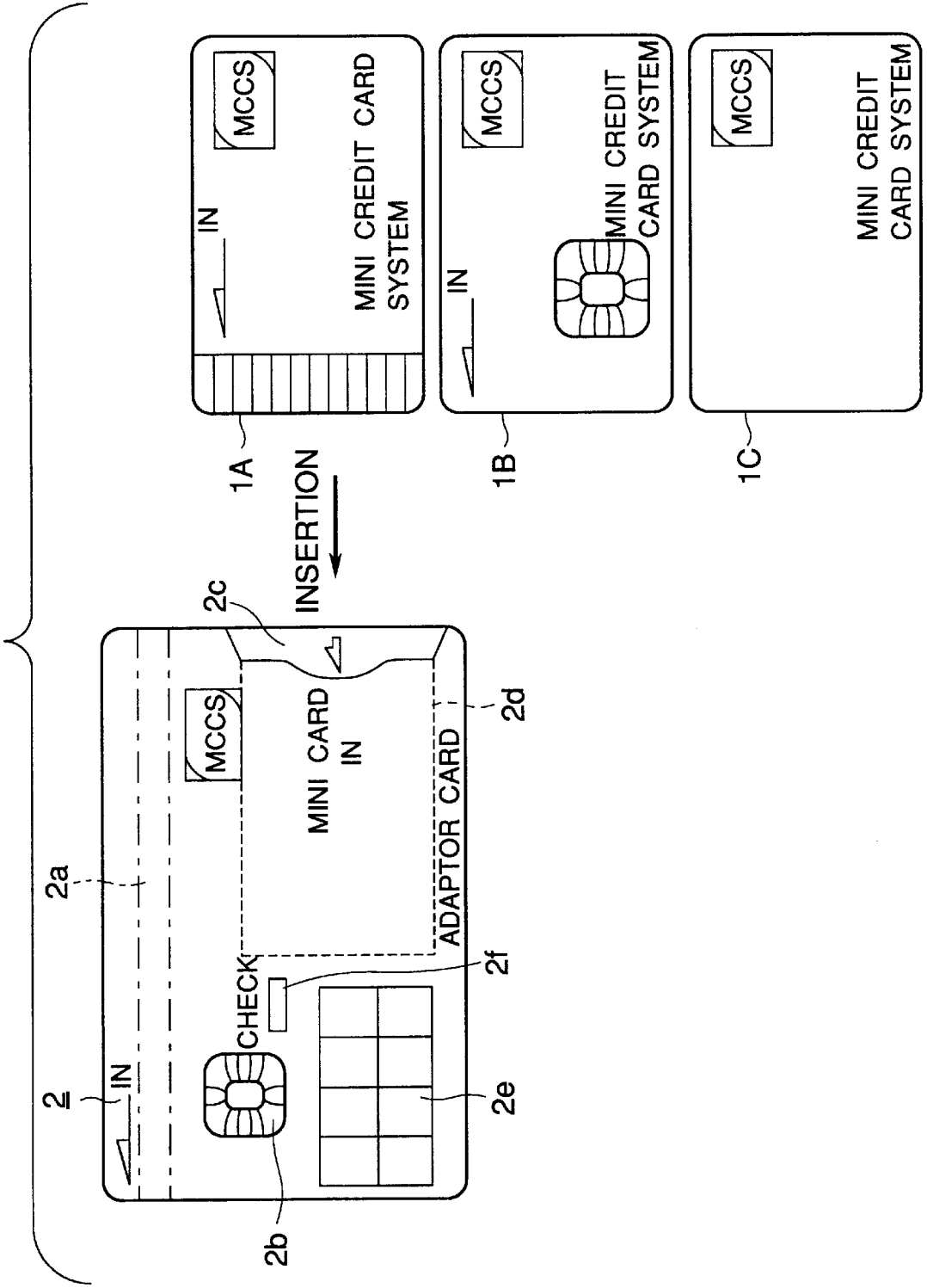
FIG. 15 is top plan views showing adapter cards used in a fourth embodiment according to the present invention.

FIG. 15 shows a front view of an adapter card used in a fourth embodiment to which a method for electronically transferring personal information of the credit gaining card is applied according to the present invention. This embodiment will be referred to as an adapter card utilization system, in which the mini card 1 (mini cards 1A through 1C in FIG. 15) is inserted into the adapter card 2 so that the mini card 1 can be handled in the similar manner as the conventional magnetic card which has been widely used.

The size of the adapter card 2 is the same with that of the conventional magnetic card and, for example, the thickness of the adapter card 2 is equal to or less than 1.5 mm. An area surrounded by one dot chain lines and denoted by reference character 2a is a magnetic strip portion having compatibility with the conventional magnetic card and information such as personal information magnetically written thereon. Or it is an area in which the information is electrically (electrostatically) written. Insertion of the small mini card 1 into the adapter card 2 ensures compatibility with the conventional magnetic card in terms of magnetic or electric (electrostatic) reading of information on the small mini card 1 that can be inserted into the cellular telephone 3.

Printed wiring connects the external connection terminal 2b, a solar panel 2e, a connection terminal in the later-described slot 2d which are provided on the front surface, any other electrical portions on the front surface of, or inside the adapter card 2 with each other to achieve predetermined functions.

Explaining the structure in detail, to the adapter card 2 are provided a slit into which the mini card 1 is inserted as denoted by reference character 2c and a slot represented by a broken line 2d inside for allowing the overall mini card 1 to be inserted into the adapter card 2. When the mini card 1 is completely inserted into the slot 2d, the external connection terminal 1a or 1b in FIG. 2 or the external connection terminal 1c in FIG. 3 is brought into contact with a connection terminal provided inside the adapter card 2, or the inductive antenna 1d in FIG. 4 enables power feeding or electric signal transfer. Contact of such connection terminals or any other means holds the completely-inserted mini card 1 to prevent the card from being easily drawn out, thus attaining the function as a stopper.

When the mini card 1 is completely inserted into the adapter card 2, a power supply switch of the adapter card 2 is turned on, which allows the electric power generated by photoelectric conversion to be supplied from a solar power supply panel 2e attached on the front surface to electronic circuits including a microprocessor or a memory of the mini card 1 as well as electronic circuits of the adapter card 2.

This microprocessor enables information such as personal information stored in the memory of the mini card 1 to be read out as magnetic information or electric (electrostatic) information on the stripe 2a with compatibility with the conventional personal information being achieved. A plurality of fine wires are provided in the same direction as in the conventional magnetic card, for instance, the direction along the width, in the stripe 2a by applying the integrated-circuit manufacturing technology so that magnetic S-pole/N-pole patterns or electric plus/minus no patterns of the information to be transmitted can be represented with compatibility with the conventional credit card being achieved. In order to read out the patterns as magnetic information, a magnetic stripe is superimposed on the fine wires. Controlling the electric current of the fine wires by the microprocessor based on the information such as personal information therefore enables the magnetic information having compatibility with the magnetic card to be written in the magnetic stripe superimposed on the top face or enables the electric (electrostatic) information having the compatibility to be transmitted.

Further, the mini card 1A and 1B can obtain compatibility with the conventional IC card having, for example, the external connection terminal by providing on the adapter card 2 the external connection terminal which is set at the same position in the IC card as designated by reference character 2b in FIG. 15 and connecting that external connection terminal with the corresponding external connection terminal 1a or 1b in FIG. 2 or 1c in FIG. 3, of the mini card 1 through wiring inside the adapter card 2.

The mini card 1C of the third example in FIG. 4 can also obtain the compatibility. That is, the mini card 1C and the adapter card 2 may transfer signals therebetween through the inductive antenna 1d in the contact-free manner to allow signal transfer through the external connection terminal 2b based on the signal transfer between the two cards. In the case where the adapter card 2 copes with the mini card 1C of the third example, the adapter card 2 includes an inductive antenna corresponding and similar to the inductive antenna 1d, electronic circuits for transferring signals using the inductive antenna in the contact-free manner or programs executed by the microprocessor.

The check lamp 2f turns on for a predetermined interval of time after complete insertion of the mini card 1 to display that the mini card 1 has been normally inserted into the adapter card 2. Also, the check lamp 2f can be used for any other purpose. When the mini card 1 is taken out from the adapter card 2, the magnetic information in the stripe 2a is erased so as to disable the information to be transferred from this area or disable the information to be transferred from the external connection terminal 2b which was connected with the taken-out mini card 1.

Figure 16:
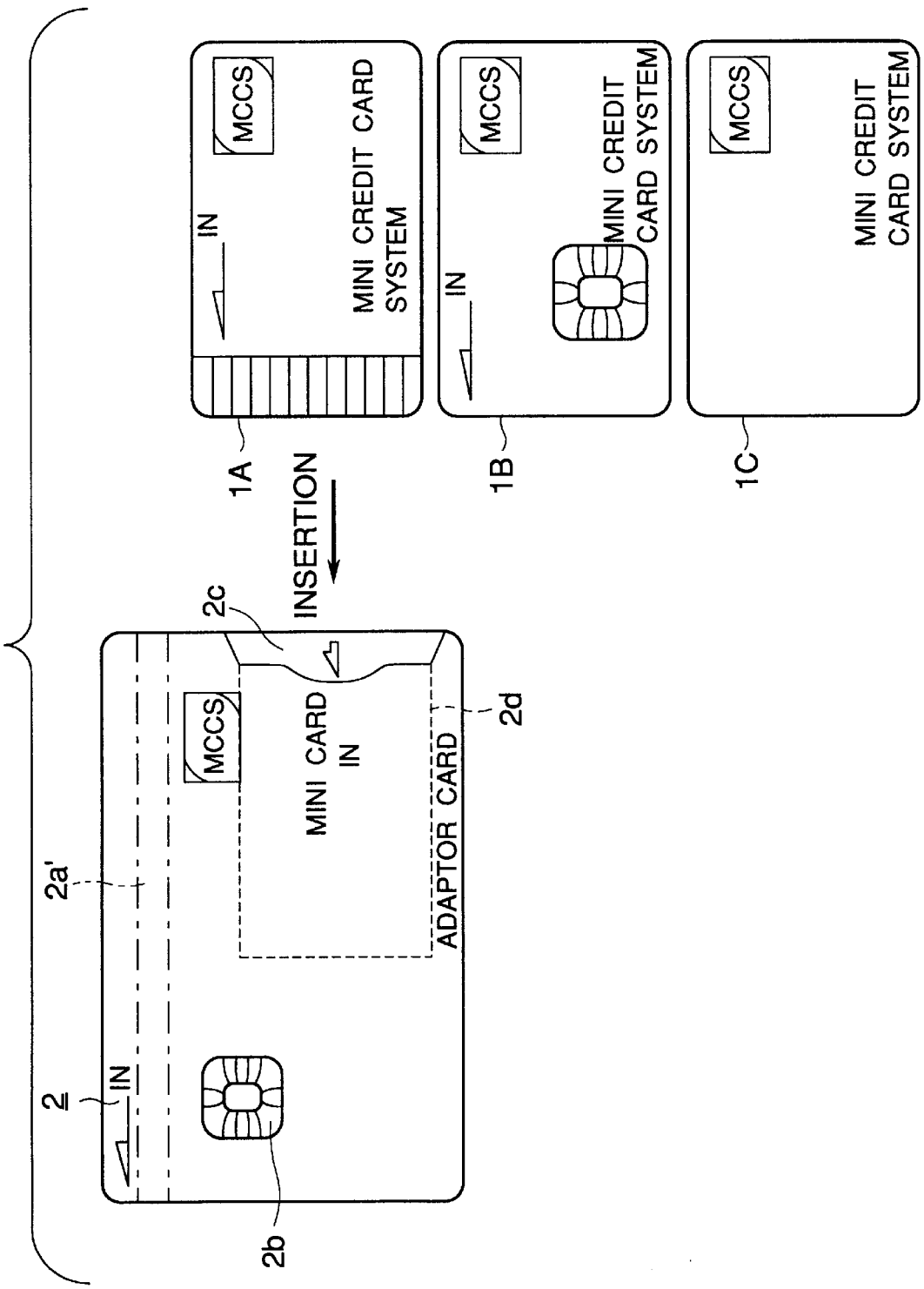
FIG. 16 is a top plan view showing dummy adapter cards used in the fourth embodiment according to the present invention.

FIG. 16 illustrates a simplified adapter card which is also referred to as a dummy adapter card. As shown in the drawing, the solar panel 2e and the check lamp 2f are removed from the adapter card in FIG. 15. The magnetic stripe indicated by reference character 2a' is formed by printing a magnetic material in a similar manner as the conventional magnetic card, and magnetic information is written therein by any card writer. The magnetic information can not be therefore written or updated by using only the simplified (dummy) adapter card. The dummy adapter card can be produced at a low cost because of its simplified structure.

Although the dummy adapter card has such a simplified structure, it can be used in a similar manner as the conventional magnetic card. Provision of the external connection terminal 2b enables the dummy adapter card to be similarly connected with the first example mini card 1A or the second example mini card 1B as the adapter card shown in FIG. 15. In case of the third example mini card 1C, signals may be directly transferred to/from the mini card 1C by using the inductive antenna 1d in the contact-free manner without using the external connection terminal 2b.

In this way, according to this embodiment, the mini card reduced in size for being inserted into the cellular telephone 3 can be used like the conventional magnetic card. Therefore, the utility value of the mini card, that is a kind of IC card and expensive as compared with the magnetic card, can be increased to enhance the cost performance and the spread of the mini card can be advanced to reduce the manufacturing cost involved by the mass production.

In addition, the credit IC card can be inserted into or connected with the cellular telephone to be used in the present invention for example, and it can be used together with the adapter card as various conventional cards, i.e., the credit card, the prepaid card, the cash card or the electronic money card adopting the conventional magnetic card or IC card. In this case, the utility value is therefore increased without the slip issuing device exclusively used for the credit IC card, and a card company or a credit payment acceptable retailer can put off investment to the slip issuing device with no problem even though spread of the slip issuing device is delayed. In other words, spread of the credit IC card is advantageous in terms of convenience or investment effects. The ingenuity which will be described later can be put into the integrated-circuit chip allowing the credit IC card to be used in the cellular telephone, and compatibility with the regular magnetic card that has been commonly used can be taken into account, thereby advancing spread of the credit IC card.

Figure 17:
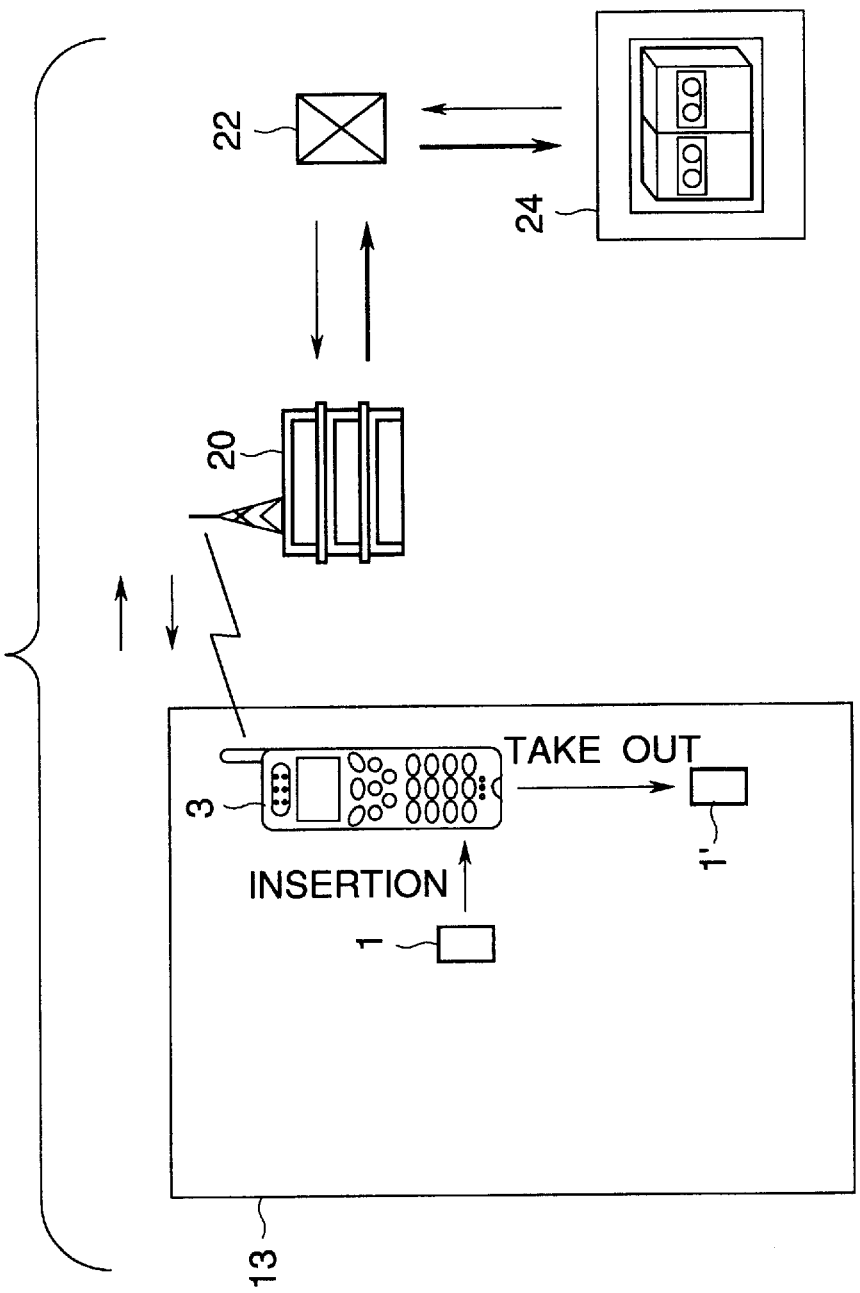
FIG. 17 is a block diagram showing a fifth embodiment to which the present invention is applied.

FIG. 17 is a block diagram showing a fifth embodiment to which a method for electronically transferring personal information of the credit gaining card is applied according to the present invention. Although this embodiment is not restricted to a certain application, it can also utilize the current slip issuing device by using the adapter card 2 (the present system is therefore partially included in the above-mentioned current slip issuing device system). This is a characteristic of the present embodiment using the adapter card 2 (the present embodiment, as well as the fourth embodiment, will be referred to as an adapter card utilization system).

Figure 18:
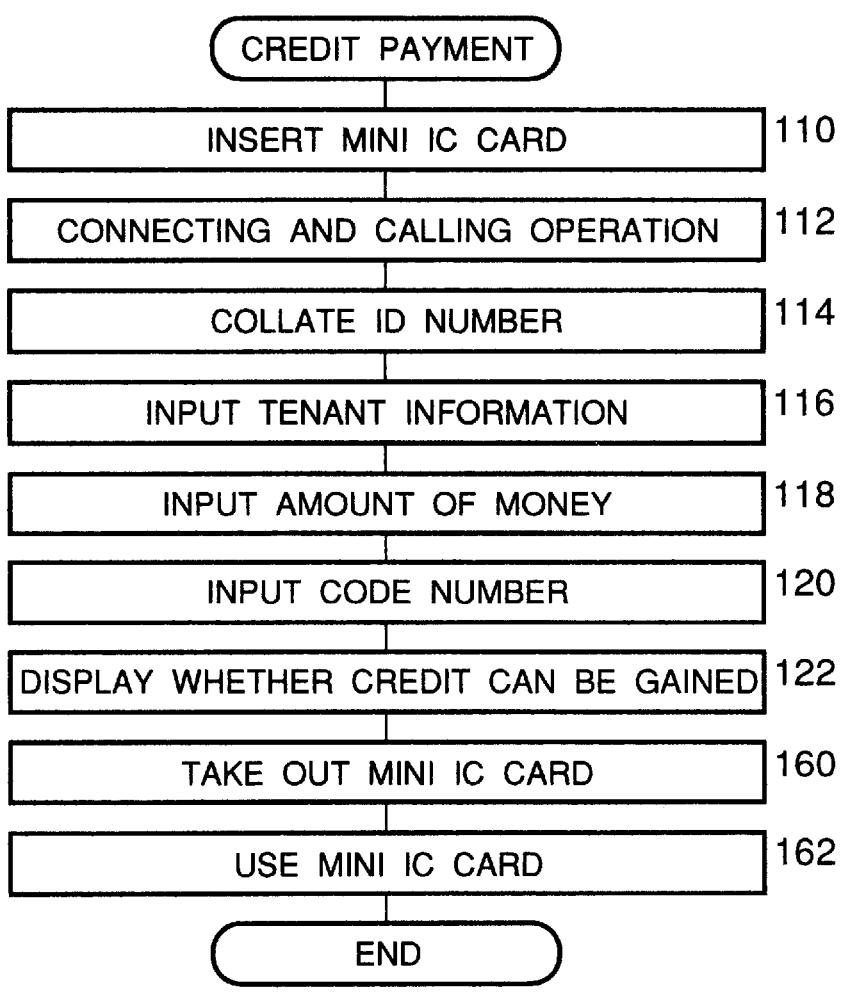
FIG. 18 is a flowchart showing operation of the fifth embodiment.

The following describes the operation of the present embodiment in connection with a flowchart of FIG. 18 in which processes of the step 110 to 122 are identical to those represented by the same numerals in FIG. 7. In this embodiment, however, if display showing that the credit can be gained is performed at the step 122, information representing that the credit can be gained is written in the mini card 1 after this display.

In the case where the mini card 1 is used as a prepaid card, a cash card or electronic money card, a prepaid (card) button, a cash (card) button or an electronic money button disposed on the operation panel of the cellular telephone 3 may be pushed in place of the credit button 3c in the step 112, for example. Instead, a function button to which functions of these buttons are assigned may be pushed. If the prepaid button, the cash button or the electronic money button has been pushed, an amount of gained credit corresponding to a remaining amount of prepaid money when used as the prepaid card, a dispensable amount of cash when used as a cash card, or a usable amount of money when used as electronic money card is obtained from the host computer 24 to be written in the memory within the mini card 1 immediately after the step 122, for example.

After the information representing that the credit can be gained was written, or after an amount of gained credit or a dispensable amount of money was written, the mini card 1 is taken out from the cellular telephone 3 at the step 160. That is, as indicated by reference character 1' in FIG. 7, the mini card 1 is taken out. The thus taken-out mini card 1 is inserted into the adapter card 2 to be used as in the fourth embodiment or it is used as it is without being inserted into the adapter card 2.

At the step 162, the mini card 1 is used by being inserted into the adapter card 2, for example. In this case, the information representing that the credit can be gained or information concerning an amount of gained credit or a dispensable amount of money written at the step 122 or immediately after the step 122 can be also used, thus increasing the utility value as compared with the conventional magnetic card.

Figure 19:
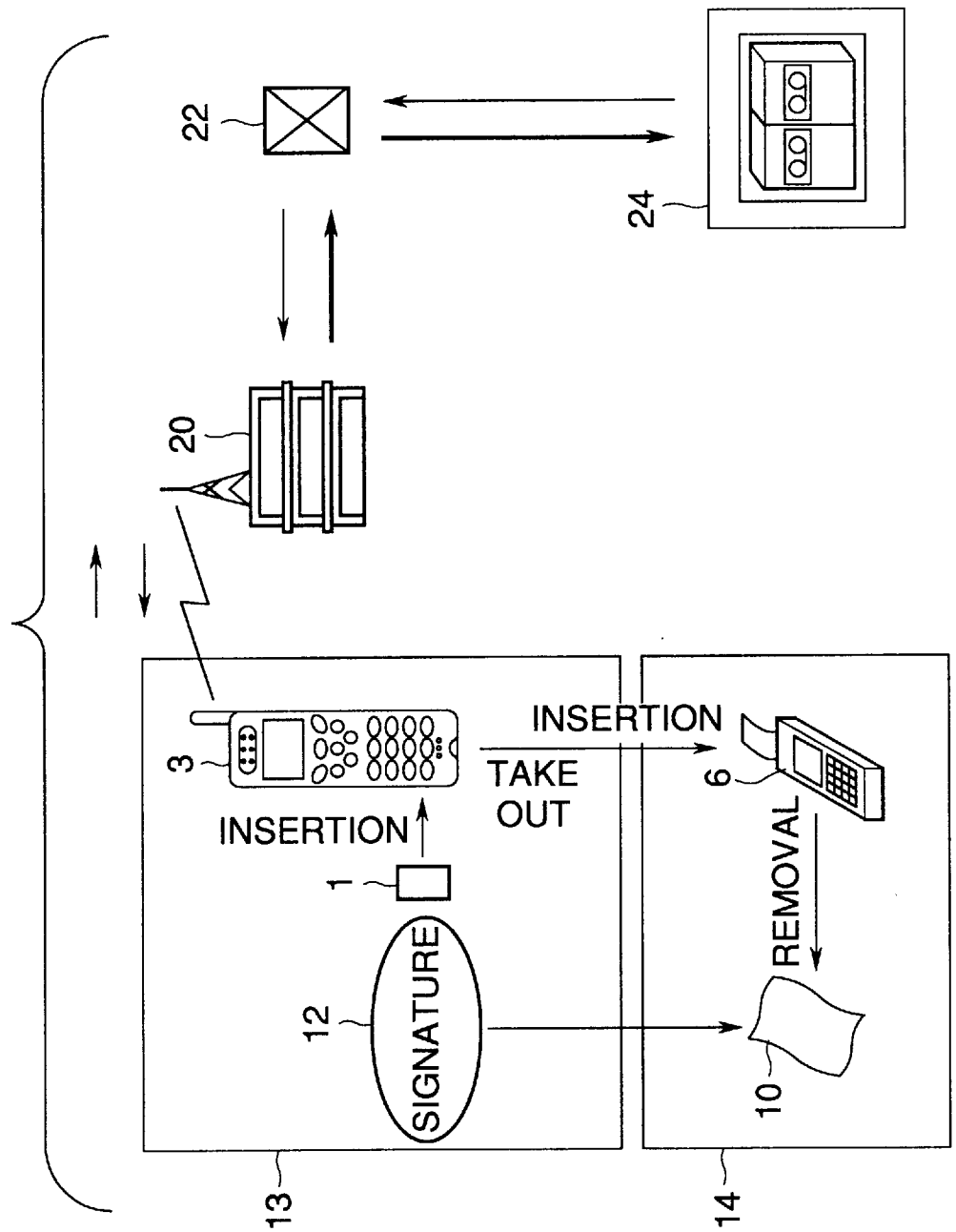
FIG. 19 is a block diagram showing a sixth embodiment to which the present invention is applied.
Figure 20:
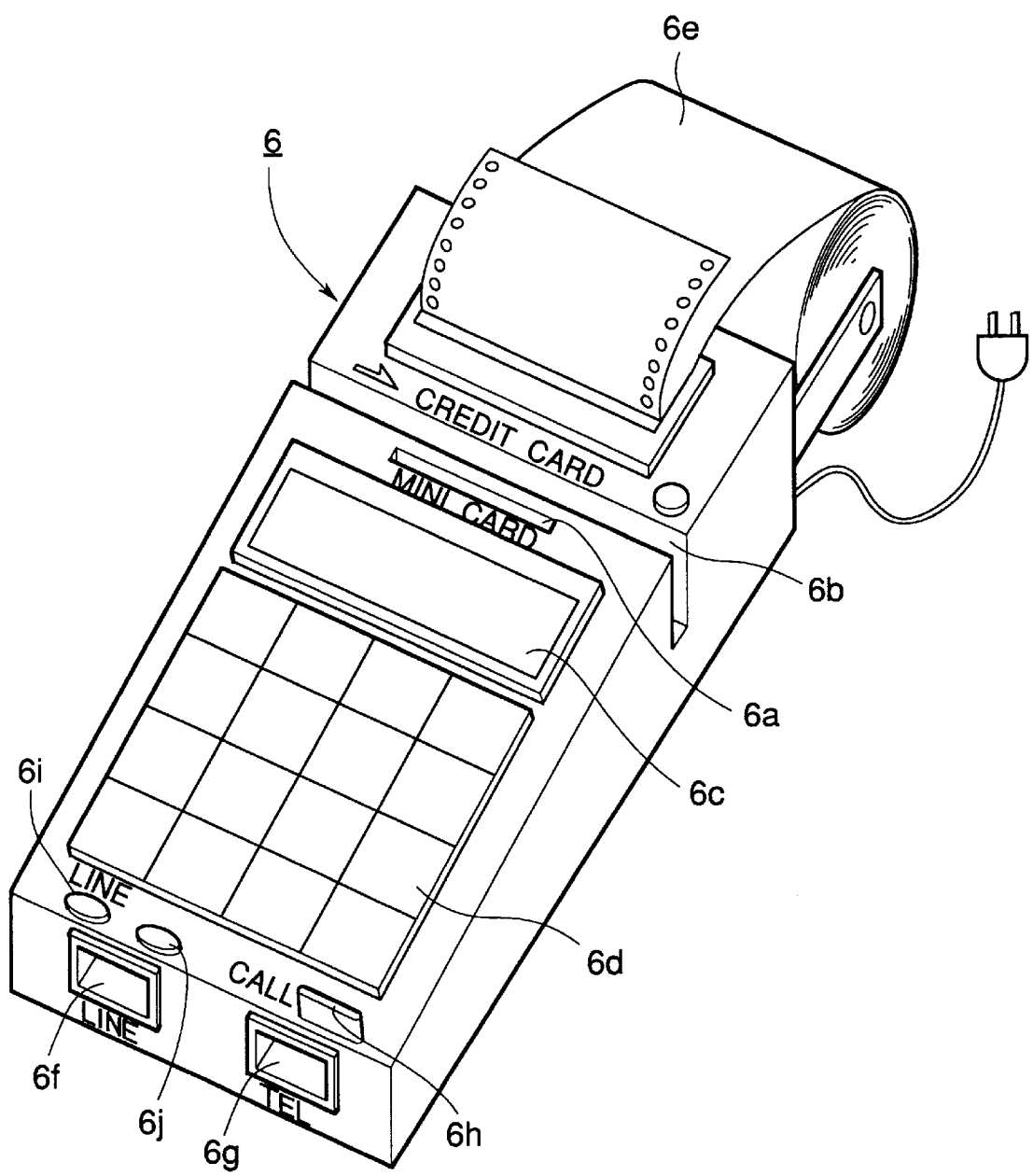
FIG. 20 is a perspective view showing a new slip issuing device used in the sixth embodiment.

FIG. 19 is a block diagram showing a sixth embodiment to which a method for electronically transferring personal information of the credit gaining card is applied according to the present invention. This embodiment is characterized in that a new slip issuing device 6 such as shown in FIG. 20 is used (which will be referred to as a new slip issuing device system). Further, this embodiment uses the slip issuing device 6 in the off-line manner (which will be referred to as an off-line system).

The slip issuing device 6 in FIG. 20 has a function of a magnetic card reader for reading out information written on a magnetic stripe of a conventional magnetic card and is provided with a magnetic card reading portion 6b used for that purpose. This magnetic card reading portion 6b can be used to read out information written on the mini card 1 inserted into the adapter card 2.

The slip issuing device 6 has a function for reading out information to be stored in the mini card 1 using only the mini card 1 without the adapter card 2, and is provided with a mini card insertion opening 6a used for that purpose. When the mini card 1A or 1B is inserted into the mini card insertion opening 6a, the external connection terminal 1a or 1b in FIG. 2 or 1c in FIG. 3 is brought into contact with a corresponding electrode provided inside the slip issuing device 6 so as to enable power feeding or electrical signal transfer. On the other hand, the mini card 1C is inserted into this mini card insertion opening 6a, power feeding or electrical signal transfer is enabled through the inductive antenna 1d and another inductive antenna, that is provided inside the slip issuing device 6 and brought into close relation with the inductive antenna 1d, with no contact achieved between the connection terminal and the electrode.

In addition, the slip issuing device 6 obtains the necessary information from the mini card 1 by operating the operation button 6d or the call button 6h while confirming display on the liquid crystal display unit 6e, and prints data on the slip form 6e to produce the credit slip. It is to be noted that the operation button 6d including the ten keys may be used when detached in the cordless manner.

Figure 22:
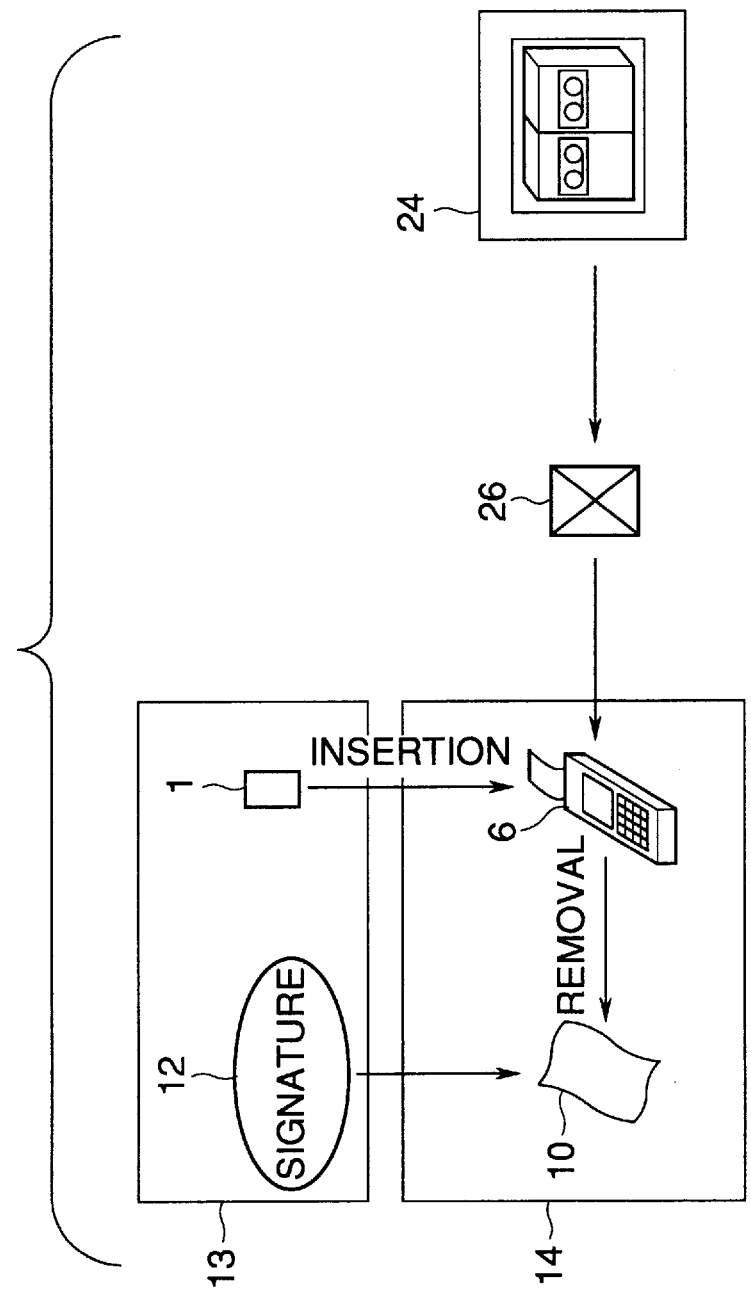
FIG. 22 is a block diagram showing a seventh embodiment to which the present invention is applied.

The slip issuing device 6 is provided with a telephone line connecting portion 6f, a telephone connecting portion 6g, a call button 6h, a display lamps 6i and 6j used in a later-described seventh embodiment. In FIG. 22 which will be described later, the telephone line connecting portion 6f is connected with the telephone exchange 26 over the telephone wire line to received information or the like required for producing the slip. To the telephone connecting portion 6g is connected a telephone.

Figure 21:
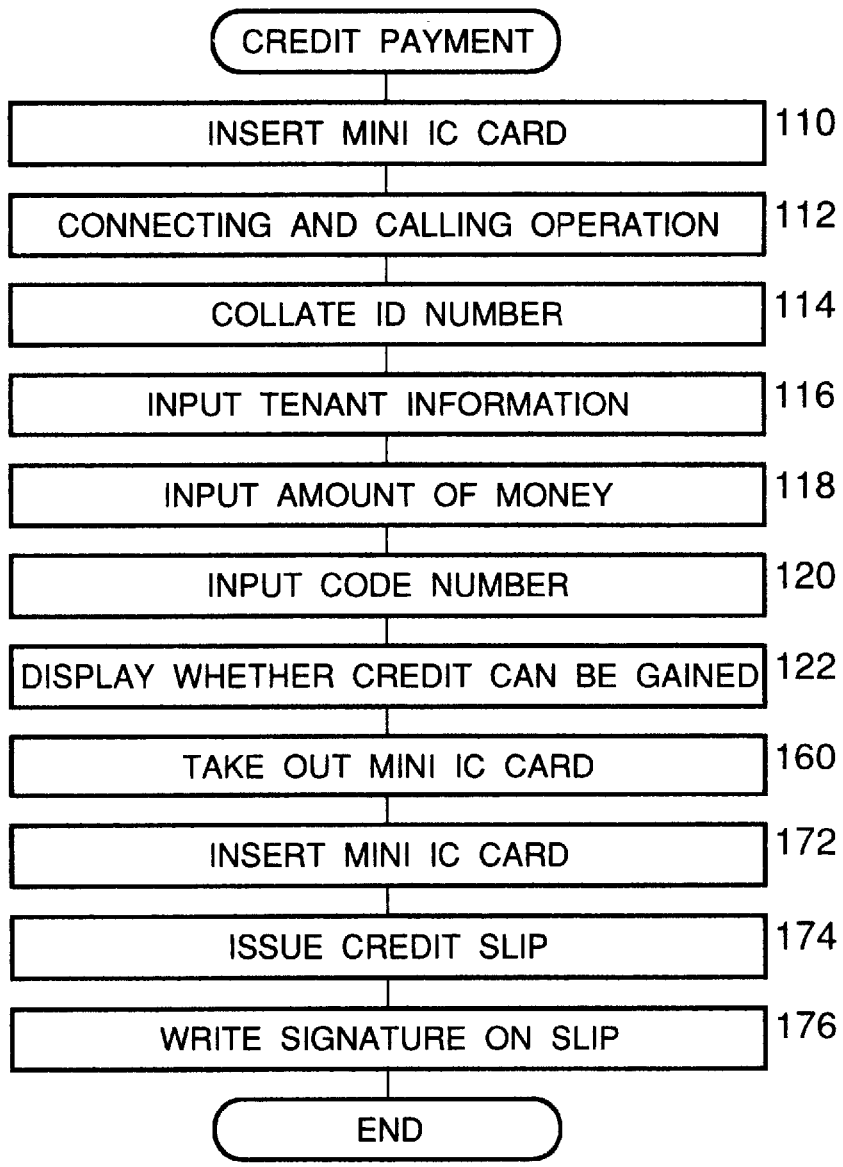
FIG. 21 is a flowchart showing operation of the sixth embodiment.

Giving explanation as to the operation of the sixth embodiment with reference to a flowchart of FIG. 21, the processes or operations of the steps 110 to 122 and 160 are equivalent to those represented by the same reference numerals in FIG. 18. The mini card 1 on which information representing that the credit can be gained was written in the steps preceding the step 160 and which was taken out in the step 160 is inserted into the mini card insertion opening 6a of the slip issuing device 6 at the step 172. At the step 174, the slip issuing device 6 is used to read out the necessary information on the mini card 1, while the credit slip 10 is automatically printed out and issued. The credit payer 13 writes his/her signature 12 on the credit slip 10 at the step 176.

In this embodiment, the mini card 1 is simply draw out from the cellular telephone 3 after writing the information representing that the credit can be gained on the mini card 1 and inserted into the slip issuing device 6, thus eliminating the need for making connection and call with respect to the host computer 24. Since some time is generally required for the connecting/calling operation, the mini card 1 can be therefore smoothly used according to the present embodiment.

FIG. 22 is a block diagram showing a seventh embodiment to which a method for electronically transferring the personal information of the credit gaining card is applied according to the present invention. In this embodiment, the new slip issuing device 6 described in connection with FIG. 20 is used (this system is included in the above-mentioned new slip issuing system). Moreover, this embodiment is effected with the slip issuing device 6 being connected with the telephone exchange 26 over the telephone wire line in the on-line manner (referred to as an on-line system).

Figure 23:
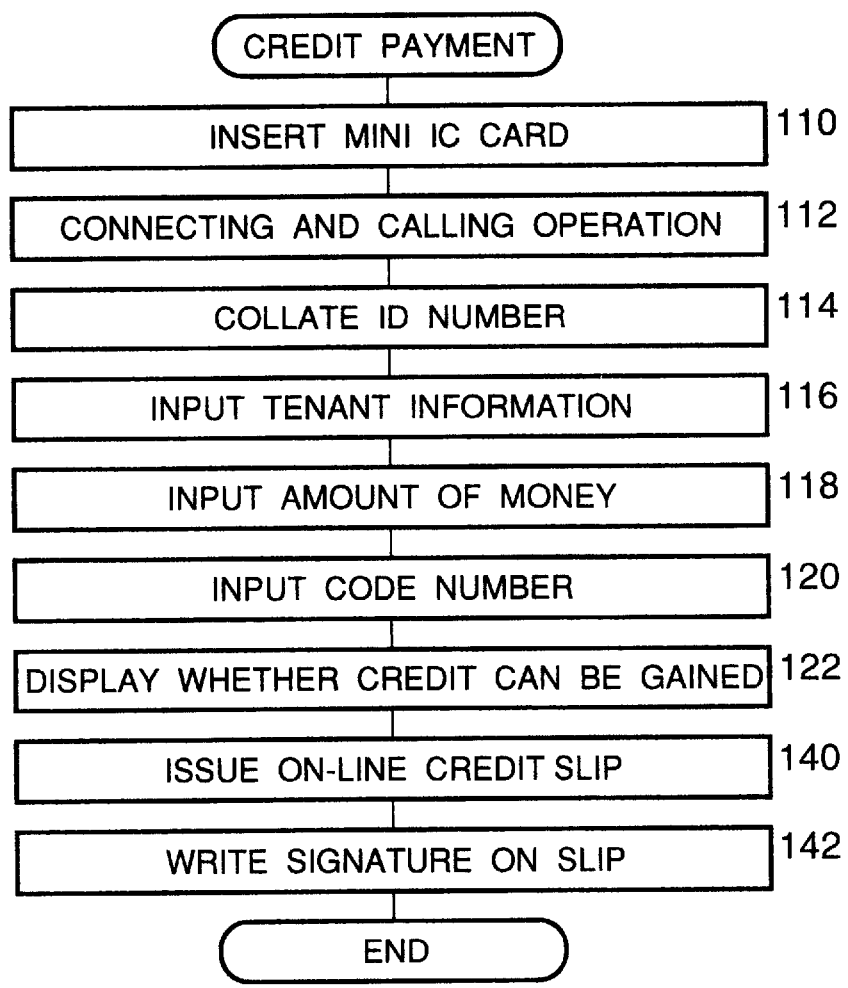
FIG. 23 is a flowchart showing operation of the seventh embodiment.

Explaining the operation of the present embodiment in connection with a flowchart of FIG. 23, the operations or processes in the steps 110 to 122, 140 and 142 are equal to those designated by the same reference numerals in FIG. 14. In the third embodiment described in connection with FIG. 14, however, the cellular telephone 3 and the conventional slip issuing device 5 are once connected with the terminal adapter 30 and further connected to the host computer 24 via the telephone exchange 26. On the other hand, in the present embodiment, only the new slip issuing device 6 is used to be connected with the host computer 24 through the telephone exchange 26. Also, the mini card 1 is directly inserted into the slip issuing device 6. The operations in the steps 110 to 122 are therefore carried out with respect to the slip issuing device 6, and display and other operations are performed in the slip issuing device 6. In the step 140, the credit slip 10 is issued from the slip issuing device 6 in the credit payment acceptable store 14.

Additionally, pushing the credit button 3c of the cellular telephone 3 in the step 112 in the third embodiment is substituted by pushing the call button 6h of the slip issuing device 6 in this embodiment, for example. Referring to FIGS. 12 and 20, the display lamp 6i substitutes for the line lamp 30a and the display lamp 6j for the error lamp 30c.

The present embodiment can therefore obtain the same effects as in the aforesaid third embodiment. In this embodiment, use of the single slip issuing device 6 can save the trouble of connecting the slip issuing device 5 or the cellular telephone 3 to the terminal adapter 30.

Figure 24:
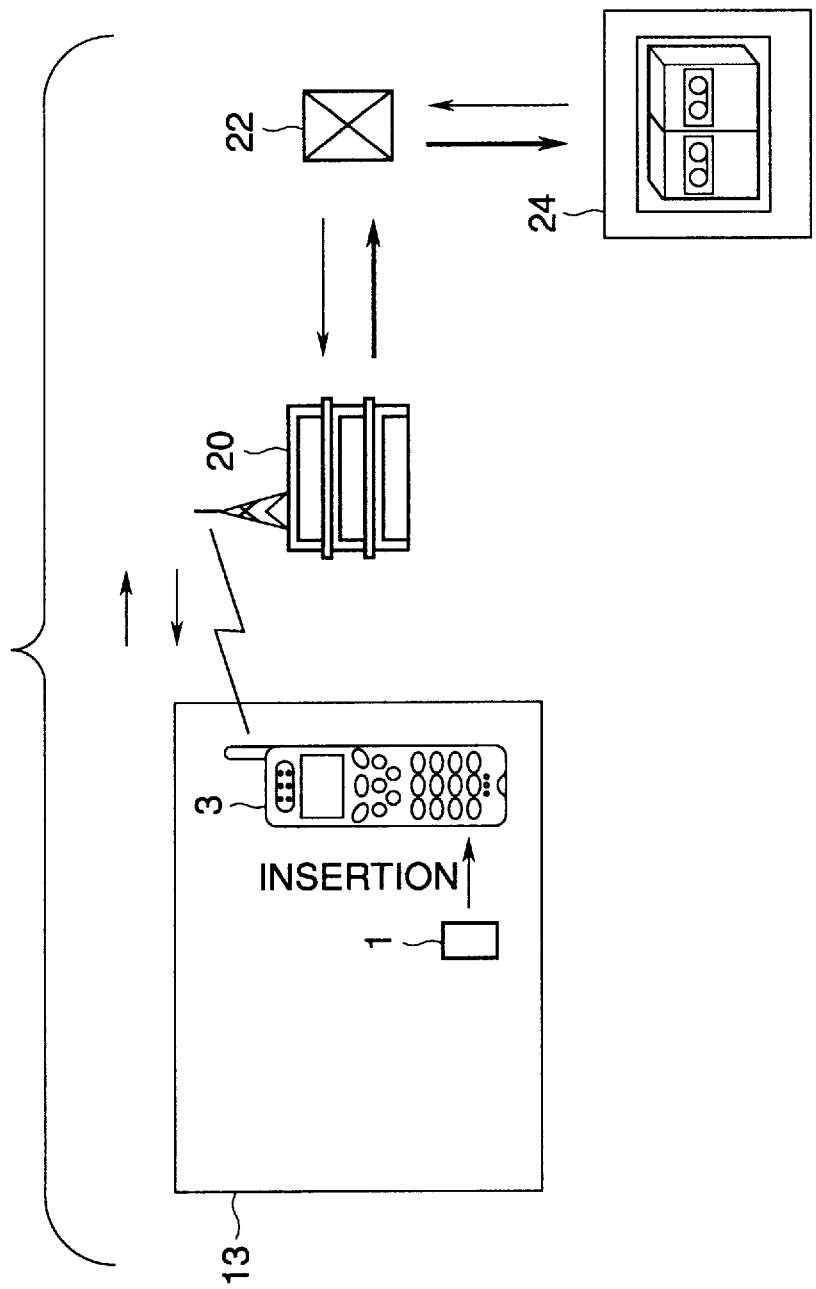
FIG. 24 is a block diagram showing an eighth embodiment to which the present invention is applied.

FIG. 24 is a block diagram showing an eighth embodiment to which a method for electronically transferring the personal information on the credit gaining card is applied according to the present invention. This embodiment aims to make a purchase from mail-order dealers such as catalogue-order dealers at home as well as abroad by utilizing the radio call function of the cellular telephone 3 and to pay the bills using the mini card 1. In this embodiment, the host computer 24 is installed by a card company. The purchase is effected with respect to the mail-order dealer via the host computer 24.

Figure 25:
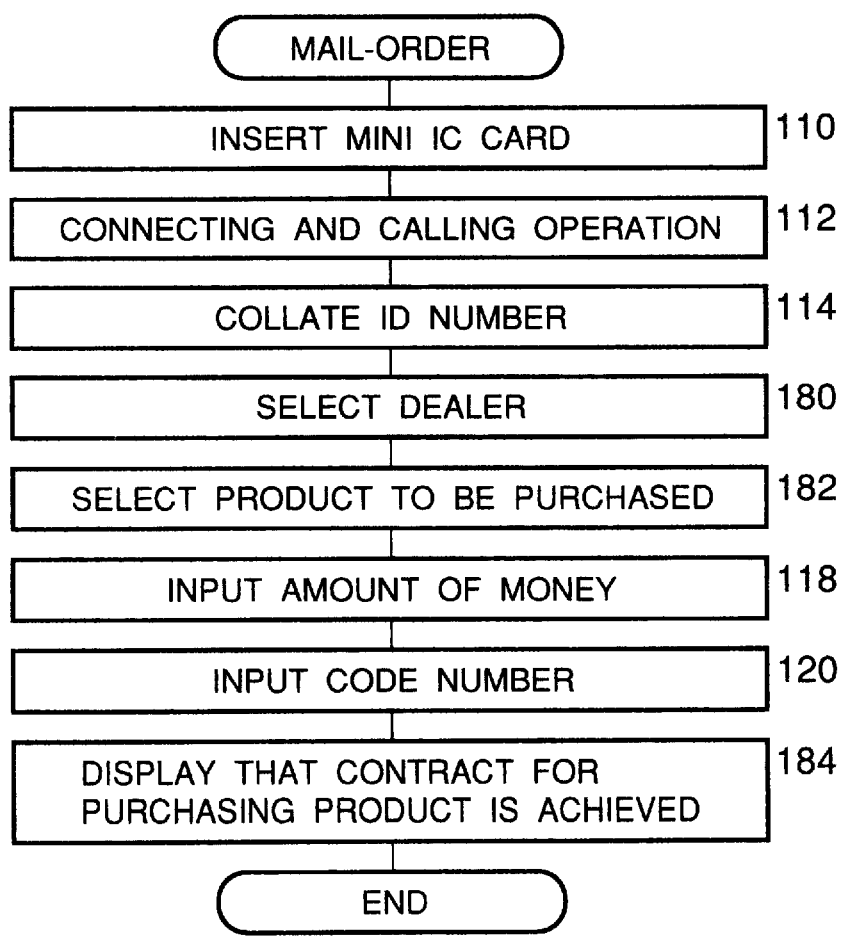
FIG. 25 is a flowchart showing operation of the eighth embodiment.

Giving description as to the operation of this embodiment in connection with a flowchart of FIG. 25, the operations or processes in the steps 110 to 114, 118 and 120 are equal to those represented by the same reference numerals in FIG. 7 of the first embodiment. In the eighth embodiment, however, the tenant information is not input because of the characteristics of the mail-order selling, but a selection of a mail-order dealer is input at the step 180 and a selection of a product to be purchased is input at the step 182. Such a selection of a mail-order dealer or a product to be purchased can be made referring to a product catalogue that has been obtained by the credit payer 13. In this embodiment, the information representing that the credit can be gained is not displayed but the information indicating that the contract for purchasing a product on credit is concluded, is displayed at the step 184 because of the characteristics of the mail-order selling.

As described thus far, according to the present invention, convenience in the mail-order selling can be improved and various procedures concerning the credit payment can be smoothly carried out. Further, such an additional value can increase the utility value of the mini card 1, thus advancing spread of the mini card 1.

The above has described the first to eighth embodiments in the mentioned order, and the functions included in the cellular telephone 3 can be classified into the following groups.

Group A (essential functions of the cellular telephone 3): a vibration function or the like informing an incoming call is included in addition to the basic functions such as a radio call function. Functions which are not inherent to a specific phone company other than functions associated with the mini card are included in this group in principle.

Group B (functions common to the above embodiments irrespective of card companies or phone companies): functions common to the above first to eighth embodiments are included irrespective of card companies or telephone companies of the cellular telephone 3, although these functions are not necessarily included in this group. For example, this group may include a function concerning the protocol for transferring information with respect to the telephone exchanges 22 or 26 or the host computer 24.

Group C (functions inherent to leading card companies or telephone companies): functions inherent to leading card companies or telephone companies out of functions according to or associated with the above first to eighth embodiments are included in this group. For instance, this group may include functions inherent to card companies issuing a large number of mini cards or a telephone company having a large number of users of the cellular telephone 3.

Group D (functions associated with regular card companies or telephone companies among those according to the above-mentioned embodiments): functions associated with non-leading card companies or telephone companies out of functions according to the above first to eighth embodiments are included in this group.

As the functions belonging to the group C or D, various additional functions can be considered. They may be a mail-order selling function for ordering a product using a communication line in, e.g., catalogue-order selling as in the above eighth embodiment. For example, products can be purchased from dealers abroad. Also, there may be included a function for downloading a program from the information center to update these additional functions as well as basic functions. The downloading operation, including the dialing operation on the telephone, may be simplified using function keys on the cellular telephone.

Here, taking into account spread of the above first to eighth embodiments or spread of the mini card to be used, a one-chip integrated circuit having the group B functions in addition to the group A functions therein can be provided. Also, provision of a one-chip integrated circuit having the group C or group D functions in addition to the group A functions therein may be effective. In addition, all the functions belonging to the groups A to D may be imparted to the one-chip integrated circuit if possible.

Figure 26:
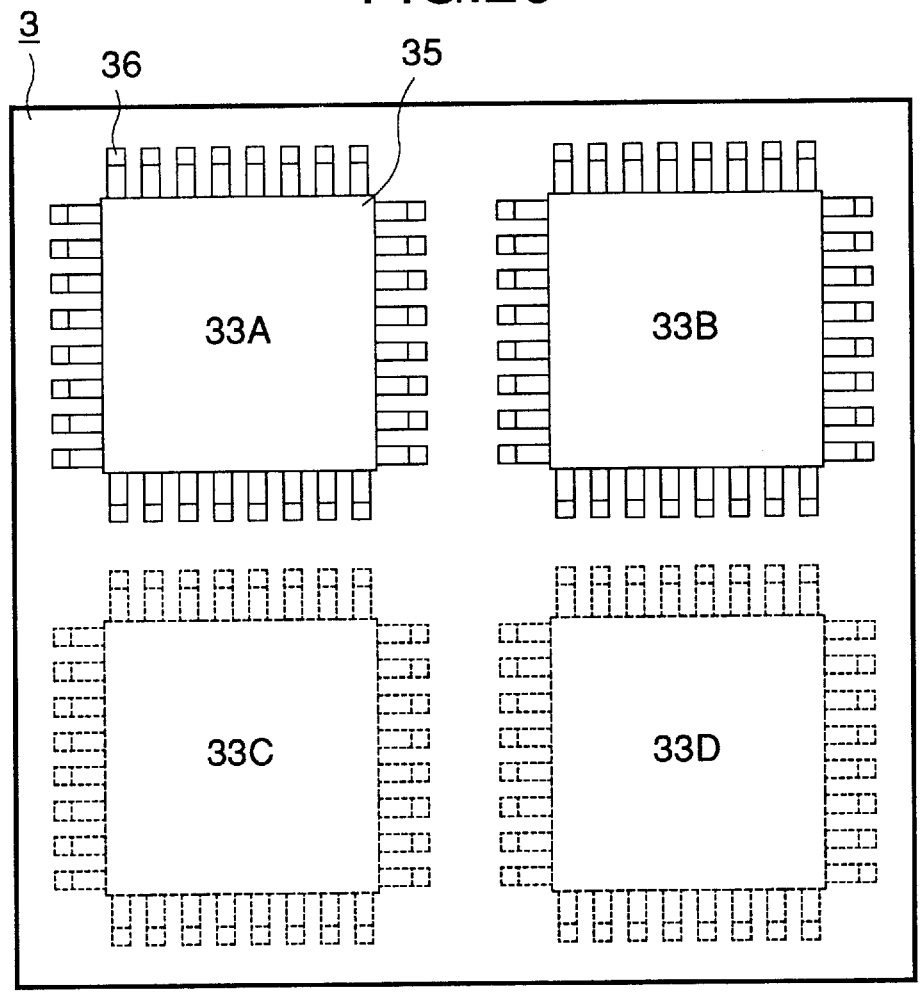
FIG. 26 is a top plan view showing an example of the configuration of integrated-circuit chips in each embodiment according to the present invention.
Figure 27:
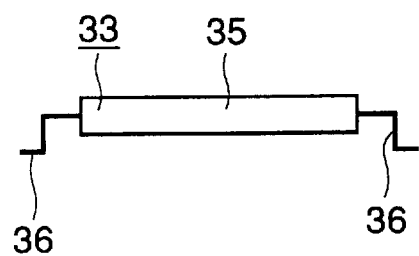
FIG. 27 is a side view of the integrated-circuit chip.

For example, integrated-circuit chips 33A to 33D mounted on the cellular telephone 3 are assumed in FIG. 26. Each of the integrated-circuit chips 33A to 33D has such a structure that a plurality of pins 36 are provided to a plastic module 35, and the side view of the integrated-circuit chip 33 is as shown in FIG. 27. Here, the functions belonging to the groups A to D may be respectively incorporated in each of the integrated-circuit chip 33A to 33D. However, employment of all these functions in the one-chip integrated circuit can enhance spread of the above embodiments or spread of the mini card, if possible. Even if all of these functions can not be adopted in the one-chip integrated circuit, the functions of the groups A and B, and the functions of the group C if possible, may be incorporated in the integrated-circuit chip 33A, and the functions of the remaining group may be incorporated in the integrated-circuit chip 33B. Use of these two integrated-circuit chips 33A and 33B may be desirable to spread the above-mentioned embodiments or the mini card. The integrated-circuit chip according to the above embodiments can be provided from a card company issuing the mini card or a telephone company of the cellular telephone 3 to a manufacturer of the cellular telephone 3 for consideration, or for free if the spread is vigorously advanced.

Although certain preferred embodiments have been shown and described, it should be understood that many changes and modifications may be made therein without departing from the scope of the appended claims

What is claimed is:

1. A mini IC card issued by a card issuing organization for use in payment by a card user with respect to a card acceptable store or the like, the mini IC card comprising:
a memory portion for storing at least personal information for identifying a card issuing organization, a card number and a card user; and
a signal transferring portion for transferring the personal information to/from outside,
the mini IC card being made smaller than a regular magnetic card on which personal information is magnetically written so as to be inserted into a portable terminal.

2. An adapter card for enabling a card reader to read out the personal information stored on the mini IC card defined in claim 1, the adapter card comprising:
a slot to which the mini IC card is inserted; and
a signal transferring portion for transferring information to/from the card reader,
the adapter card being made as large as a regular magnetic card.

3. A terminal adapter, to which the portable terminal having the mini IC card defined in claim 1 inserted therein is connected, for inquiring of an information center of a card issuing organization on whether the credit can be gained, the terminal adapter characterized by being provided with a function for connecting the portable terminal to the information center over a telephone wire line based on input of a code number by the card user and the stored information electronically read out from the mini IC card when the portable terminal automatically inquires of the information center of the card issuing organization whether the credit can be gained.

4. A slip issuing device, to which the mini IC card defined in claim 1 is connected, for inquiring of an information center of a card issuing organization on whether the credit can be gained, the slip issuing device characterized by being provided with a function for automatically inquiring of the information center of the card issuing organization whether the credit can be gained based on input of a code number by the card user and the stored information electronically read out from the mini IC card and a function for issuing a slip upon receiving necessary information from the information center.

5. A portable terminal, to which the mini IC card defined in claim 1 can be inserted, for electronically transferring personal information on a credit gaining card, the portable terminal characterized by including therein a one-chip integrated circuit incorporating at least a part of functions of a regular portable terminal and at least basic function for automatically inquiring of an information center of a card issuing organization whether the credit can be gained based on input of a code number by the card user and the stored information electronically read out from the mini IC card.

* * * * *